US008886167B2

(12) United States Patent
Aso et al.

(10) Patent No.: US 8,886,167 B2
(45) Date of Patent: Nov. 11, 2014

(54) COMMUNICATION NODE AND NETWORK NODE

(75) Inventors: Keigo Aso, Kanagawa (JP); Shinkichi Ikeda, Kanagawa (JP); Takahisa Aoyama, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 303 days.

(21) Appl. No.: 13/635,971

(22) PCT Filed: Mar. 16, 2011

(86) PCT No.: PCT/JP2011/001556
§ 371 (c)(1),
(2), (4) Date: Sep. 19, 2012

(87) PCT Pub. No.: WO2011/121921
PCT Pub. Date: Oct. 6, 2011

(65) Prior Publication Data
US 2013/0005387 A1 Jan. 3, 2013

(30) Foreign Application Priority Data

Mar. 29, 2010 (JP) ................................ 2010-075557
Apr. 30, 2010 (JP) ................................ 2010-105294

(51) Int. Cl.
*H04L 12/58* (2006.01)
*H04W 76/02* (2009.01)
*H04W 4/00* (2009.01)
*H04W 8/24* (2009.01)

(52) U.S. Cl.
CPC .............. *H04W 76/02* (2013.01); *H04W 4/005* (2013.01); *H04W 8/245* (2013.01); *H04W 76/027* (2013.01); *Y02B 60/50* (2013.01)

USPC ................ 455/412.1; 455/412.2; 455/414.2; 455/456.2; 710/1

(58) Field of Classification Search
CPC ....... H04W 4/005; H04W 4/00; H04W 4/001; H04W 4/003; H04W 76/02; H04W 76/021; H04W 76/022; H04W 76/05; H04W 76/027; H04W 76/028; H04W 8/245; H04W 8/26; H04W 8/265; H04W 8/28; H04W 28/00
USPC .............. 455/517, 445, 520, 406, 411, 426.1, 455/426.2, 414.2, 456.2, 412.1, 412.2; 370/328, 252, 254, 338, 432, 401, 255, 370/400, 389, 327, 352; 709/231, 217, 224, 709/227; 710/1
See application file for complete search history.

(56) References Cited

U.S. PATENT DOCUMENTS

| 6,385,654 | B1 * | 5/2002 | Tanaka .......................... 709/231 |
| 7,649,872 | B2 * | 1/2010 | Naghian et al. ............... 370/338 |
| 8,059,560 | B2 * | 11/2011 | Ushiyama et al. ............ 370/254 |
| 2002/0169867 | A1 * | 11/2002 | Mann et al. .................... 709/224 |
| 2003/0131156 | A1 * | 7/2003 | Aizu et al. ........................ 710/1 |
| 2005/0148891 | A1 * | 7/2005 | Yamashita .................... 600/509 |
| 2005/0153725 | A1 * | 7/2005 | Naghian et al. ............... 455/520 |
| 2006/0114819 | A1 | 6/2006 | Shimizu |
| 2007/0174469 | A1 * | 7/2007 | Andress et al. ............... 709/227 |
| 2007/0294714 | A1 * | 12/2007 | Yamaoka et al. ............. 720/718 |
| 2008/0002686 | A1 * | 1/2008 | Valli et al. ..................... 370/389 |
| 2009/0041035 | A1 * | 2/2009 | Matsuo et al. ................ 370/400 |
| 2009/0135764 | A1 * | 5/2009 | In et al. ......................... 370/328 |

FOREIGN PATENT DOCUMENTS

| JP | 10-065754 A | 3/1998 |
| JP | 2003-169075 A | 6/2003 |
| JP | 2003-256308 A | 9/2003 |
| JP | 2006-154991 A | 6/2006 |
| JP | 2007-219650 A | 8/2007 |
| WO | 03/027859 A1 | 4/2003 |

OTHER PUBLICATIONS

"3rd Generation Partnership Project; Technical Specification Group Services and System Aspects; System Improvements for Machine-Type Communications", 3GPP TR 23.888, V0.3.1, Mar. 2010.

"3rd Generation Partnership Project; Technical Specification Group Services and System Aspects; Service requirements for machine-type communications", 3GPP TS 22.368, V1.1.1, Nov. 2009.
International Search Report for PCT/JP2011/001556 dated May 24, 2011.

\* cited by examiner

*Primary Examiner* — Tan Trinh
(74) *Attorney, Agent, or Firm* — Pearne & Gordon LLP

(57) ABSTRACT

Disclosed is a technique to enable a communication node to acquire predetermined newer information (e.g., configuration information) held by another communication node while minimizing power consumption by communication nodes. According to the technique, when receiving a request for configuration information from a new MTC device 100, a MME 220 checks whether an existing MTC device 110 as a request target for configuration information connects or not. When the existing MTC device does not connect, the new MTC device is notified of time information (e.g., next connection time of the existing MTC device, a next connection time of a new MTC device or a next connection time zone of the new MTC device). This time information enables the new MTC device to specify a time after the MME acquires and holds the configuration information from the existing MTC device. The new MTC device reconnects based on this time information, whereby the new MTC device can acquire desired configuration information from the MME.

18 Claims, 18 Drawing Sheets

COMMUNICATION NODE AND NETWORK NODE

TECHNICAL FIELD

The present invention relates to a communication node and a network node configured to autonomously exchange information between communication nodes, and particularly relates to a communication node and a network node using a technique of MTC (Machine Type Communication).

BACKGROUND ART

Unlike a communication (H2H: Human to Human, H2M: Human to Machine) mainly performed by users using a terminal such as a mobile phone equipped with a lot of user interfaces, there is an intra-machine communication (called Machine to Machine or Machine type Communication, hereinafter described as M2M) as a communication form using a device operable solely without necessity of a direct operation by a user.

In M2M, one or a plurality of devices (MTC devices) are located at ends to collect necessary information as needed, and such devices detect and measure information (sensing data) using a sensing function (e.g., temperatures, seismic intensities and water quantities) that each MTC device has. The detected and measured information is collected at a server (MTC server) configured to manage the MTC devices, and various services are provided to users on the basis of such information. The users receive services via the MTC server on the basis of the information reported from the MTC devices.

As means to establish a communication path between the MTC devices and the MTC server, not only wired networks such as a telephone line, a DSL (Digital Subscriber Line) and an optical communication line but also wireless networks such as mobile phone networks can be used. Especially using a wireless network, since there is substantially no limitation on the installation positions of the MTC devices, the MTC devices can be installed in a wide range, which can be said very effective communication means.

Typical wireless communication systems used for mobile phones or the like, however, are optimized for mobile phones, and such a system is not always optimum for a MTC device that provides a service specific to M2M. For instance, a mobile phone is required to regularly check paging from a network side so as to receive an incoming call for verbal communication addressed to the mobile phone. On the other hand, in the case of a MTC device without a verbal communication function, such a device is not required to be always in a ready state of receiving paging, and therefore such an operation is not necessary. Further, since MTC devices are installed at wide-ranging locations and they are less in contact with users, there is a small possibility for the MTC devices to be placed in a state always receiving electric power. For this reason, the MTC devices have to use limited electric power from battery cells or batteries, and so they are required to minimize power consumption for a longer operation time. Especially electric power consumed by a wireless interface used for communication cannot be ignored, and optimization of a wireless communication system for MTC devices is an issue to be necessarily coped with for the MTC devices using wireless communication. Herein the issue of optimizing a mobile phone network for M2M is currently being discussed in 3GPP (refer to the below-described Non-Patent Document 1 and Non-Patent Document 2).

Further as the installation scale becomes larger, the number of MTC devices operating would be enormous. Therefore when a large number of MTC devices connect to a network simultaneously to start transmission/reception of data, congestion is expected in a wireless network and a core network. Accordingly a system to minimize the concentration of accesses has to be provided.

In this way, considering the reduction of power consumption, it is not practical to always connect MTC devices to a network to secure a connection with a MTC server. Instead, it is appropriate to connect MTC devices to a network as necessary and during a necessary time only. To this end, a possible method considered (Time Control) is to designate a time interval (time zone) for a MTC device to access a network in advance and control the MTC device to access the network during the time interval. When a same time interval is designated for a plurality of MTC devices, there is a need to avoid congestion that might occur when the plurality of MTC devices access a network simultaneously. According to the currently considered method, a MTC device receives, from a network or a MTC server, a notification of a time interval when an access is permitted, and connects to the network at any timing in the designated time. Since access timing is randomly decided by each device, even when a plurality of MTC devices are notified of the same time interval, access timing by each device can be distributed so as to avoid the concentration of accesses. This method can limit access time of a plurality of MTC devices (e.g., a MTC device group belonging to the same group) to a network simply by designating, by a network, a common time interval to the MTC device group. Further since access timing is decided at each MTC device's discretion, management cost on a network side can be reduced.

The following describes the case where a MTC device needs information that another MTC device holds (configuration data, i.e., configuration information). For instance, a MTC device newly connecting to a network (new MTC device) has to acquire information necessary to operate as a MTC device. To this end, the new MTC device firstly accesses a MTC server managing the MTC device and requests necessary configuration information. After the MTC server authenticates the accessing MTC device, the MTC server notifies the new MTC device of necessary information. As a result, the new MTC device starts an operation as a MTC device on the basis of the acquired information.

PRIOR ART DOCUMENTS

Non-Patent Documents

Non-Patent Document 1: "3rd Generation Partnership Project; Technical Specification Group Services and System Aspects; System Improvements for Machine-Type Communications", 3GPP TR 23.888, V0.3.1, March 2010.

Non-Patent Document 2: "3rd Generation Partnership Project; Technical Specification Group Services and System Aspects; Service requirements for machine-type communications", 3GPP TS 22.368, V1.1.1, November 2009.

However, when the MTC server does not have some information required by the new MTC device, such information has to be acquired from another server or another MTC device. For instance, in one assumed case, information held by the MTC server is just static information, and dynamic information is held by a MTC device already operating (existing MTC device) only. Such information may include knowledge acquired through a MTC device's determination and learning by itself. Some static information may be held by a MTC device only, and in such a case, the new MTC device cannot acquire all necessary information from the server and unfortunately cannot operate adequately.

On the other hand, it is not practical to collect all information held by all MTC devices under management at a MTC server and notify a MTC device of such information in response to a request from the MTC device. This is because since each MTC device has to always notify the MTC server of information, which consumes a bandwidth of the network and increases power consumption of the MTC devices. When MTC devices are time-managed, their access time to the MTC server is limited and a notification is made only at a limited time, and therefore the server does not always hold the newest information at the timing of the connection of the new MTC device.

SUMMARY OF INVENTION

In view of the above-stated problems, it is an object of the present invention to provide a communication node and a network node enabling a communication node to acquire predetermined newer information (e.g., configuration information) held by another communication node while minimizing power consumption by communication nodes.

In order to fulfill the above-stated object, according to the present invention, a network node of the present invention is in a communication system including an existing communication node already connected to a network under management of the network node and including a new communication node newly connecting to the network to acquire predetermined information of the existing communication node. The network node includes: a connection checking unit configured to check whether the existing communication node connects or not to the network when receiving a request for the predetermined information from the new communication node; a first predetermined information acquisition unit configured to request the predetermined information from the existing communication node and acquire the predetermined information from the existing communication node when the connection checking unit confirms that the existing communication node connects to the network; a first predetermined information notification unit configured to notify the new communication node of the predetermined information acquired by the first predetermined information acquisition unit; a time information notification unit configured to notify the new communication node of time information to allow the new communication node to decide a next connection time, when the connection checking unit confirms that the existing communication node does not connect to the network; a second predetermined information acquisition unit configured to request the predetermined information from the existing communication node and acquire the predetermined information from the existing communication node, when a connection of the existing communication node to the network is confirmed after notification of the time information to the new communication node by the time information notification unit; a predetermined information holding unit configured to hold the predetermined information acquired by the second predetermined information acquisition unit; and a second predetermined information notification unit configured to notify the new communication node of the predetermined information held by the predetermined information holding unit, when a connection of the new communication node to the network based on the time information is confirmed.

This configuration enables a communication node to acquire predetermined newer information (e.g., configuration information) held by another communication node while minimizing power consumption by communication nodes.

In order to fulfill the above-stated object, a communication node of the present invention operates as a new communication node in a communication system including an existing communication node already connected to a network under management of a network node and including the new communication node newly connecting to the network to acquire predetermined information of the existing communication node. The communication node includes: a first predetermined information request unit configured to transmit a request for the predetermined information to the network node; a first predetermined information acquisition unit configured to receive the predetermined information from the network node as a response to the request for the predetermined information by the first predetermined information request unit; a time information reception unit configured to receive time information to decide a next connection time of the new communication node as a response to the request for the predetermined information by the first predetermined information request unit; a connection time decision unit configured to decide a next connection time of the new communication node to the network on a basis of the time information; a second predetermined information request unit configured to connect to the network at the connection time decided by the connection time decision unit to transmit a request for the predetermined information to the network node; and a second predetermined information acquisition unit configured to receive the predetermined information from the network node as a response to the request for the predetermined information by the second predetermined information request unit.

This configuration enables a communication node to acquire predetermined newer information (e.g., configuration information) held by another communication node while minimizing power consumption by communication nodes.

In order to fulfill the above-stated object, a communication node of the present invention operates as an existing communication node in a communication system including the existing communication node already connected to a network under management of a network node and including a new communication node newly connecting to the network to acquire predetermined information of the existing communication node. The communication node includes: a predetermined information request reception unit configured to receive a request for the predetermined information from the network node during a connection to the network; and a predetermined information notification unit configured to notify the network node of the predetermined information as a response to the request for the predetermined information.

This configuration enables a communication node to acquire predetermined newer information (e.g., configuration information) held by another communication node while minimizing power consumption by communication nodes.

The present invention is configured as stated above, and has the advantageous effect of enabling a communication node to acquire predetermined newer information (e.g., configuration information) held by another communication node while minimizing power consumption by communication nodes.

DESCRIPTION OF EMBODIMENTS

Figure 1:
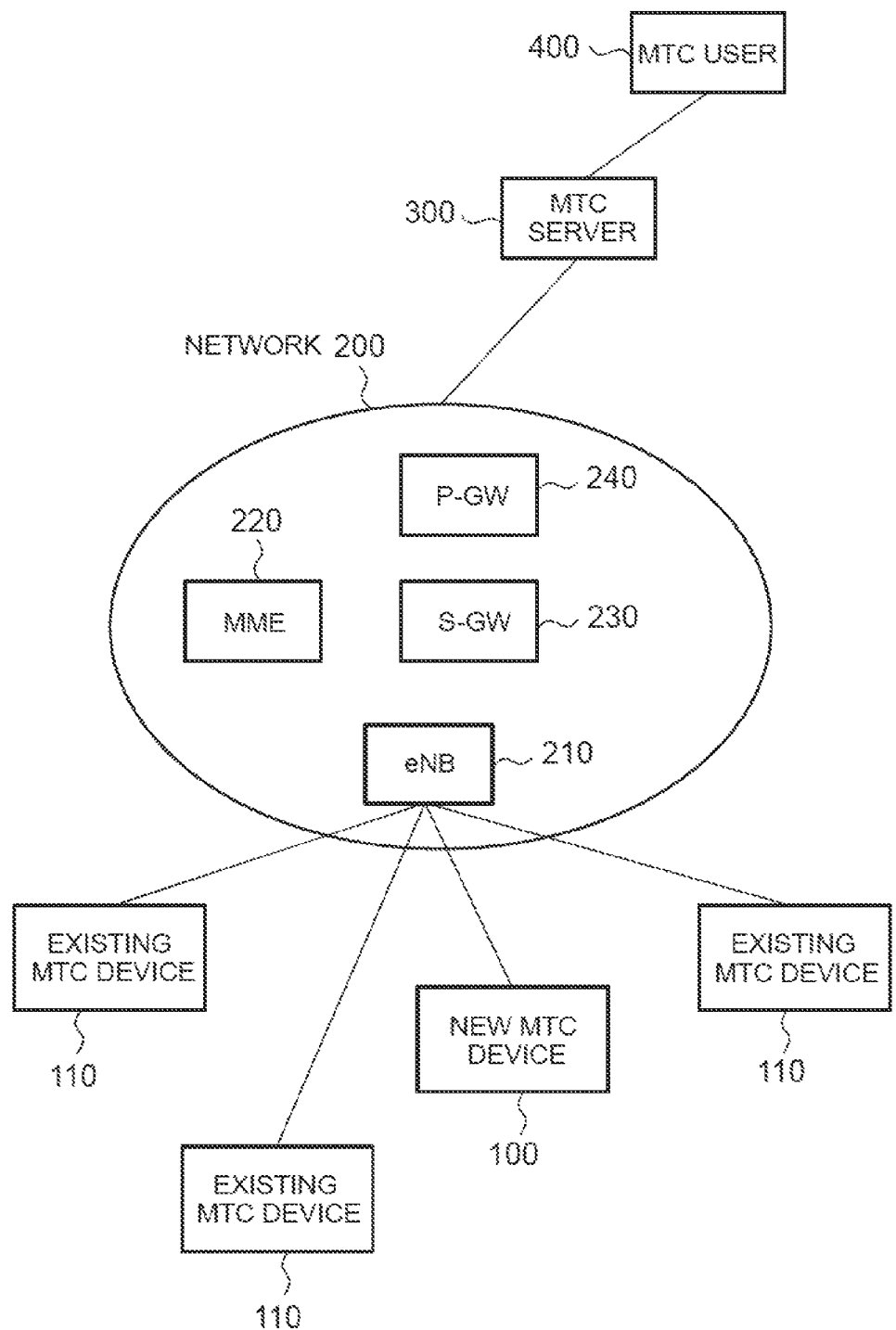
FIG. 1 shows an exemplary network configuration in Embodiment 1 of the present invention.

The following describes Embodiment 1 to Embodiment 4 of the present invention with reference to the drawings. The present invention is configured to when a new MTC device (a MTC device connecting to a network for the first time) requests configuration information, acquire the configuration information from an existing MTC device in a connection state (already starts an operation and has connected to the network) and pass the configuration information to the new device. The present invention is further configured to, when the existing MTC device is not in a connection state (when the existing MTC device cannot pass the configuration information promptly), pass time information to the new MTC device, the time information being for deciding a next connection time of the new MTC device and pass the configuration information that the existing MTC device holds to the new device when the new MTC device connects again on the basis of this time information. In Embodiment 1 of the present invention, when an existing MTC device is not in a connection state, a time when the existing MTC device connects next time (existing MTC device connection time) is passed as time information to decide a next connection time of the new MTC device. In Embodiment 2 of the present invention, when an existing MTC device is not in a connection state, a next connection time of the new MTC device is passed as time information to decide a next connection time of the new MTC device. In Embodiment 3 of the present invention, when an existing MTC device is not in a connection state, a next connection time interval (next connection time zone) of the new MTC device is passed as time information to decide a next connection time of the new MTC device. Embodiment 4 of the present invention describes the case where, in order to allow an existing MTC device to deliver information to be reported to another MTC device (new MTC device or existing MTC device) or a MTC server more quickly, a next connection time is set earlier to transmit the information. Herein in Embodiments 1 to 4 of the present invention, a MTC device requiring information is called a new MTC device, and a MTC device holding the information is called an existing MTC device. Naturally, however, an entity requiring information is not limited to a MTC device newly connecting to the network, and even a MTC device already connected may require information that another MTC device holds. Further, needles to say, the entity requiring information may be a MTC server. The entity holding information also is not limited to a MTC device already connected but a MTC device newly connected to the network. In the following description, configuration information is described as information that the MTC device reports or acquires, but any information may be exchanged as long as it is effective information for MTC devices on the acquisition side and on the provision side. For instance, exemplary information include information, operations and a behavior history that a sensor, an application and the like operating on a MTC device on the information provision side collect and information that a MTC device on the information provision side collects from another MTC device, a MTC server or the like. More specifically, they may be information (past and future movement path information, a behavior pattern, detection information and body information on a user) detected and stored by a car navigation or a PND (Portable Navigation Device) mounted on a vehicle and a GPS locator-equipped mobile terminal (mobile phone, smartphone) carried by a driver or a pedestrian. The following describes embodiments while calling the information requesting side a new MTC device and calling the information providing side an existing MTC device. However, even in the case where a new device transmits a message (information notification message) to notify the existing MTC device of information, various means described in Embodiments 1 to 4 of the present invention can be used.

Embodiment 1

To begin with, the following describes Embodiment 1 of the present invention.

FIG. 1 shows an exemplary network configuration in Embodiment 1 of the present invention. In FIG. 1, assume that a plurality of MTC devices operate already in a network and a MTC device is newly connecting to the network. In the present specification, a MTC device that already starts an operation and has already connected to a network 200 is described as an existing MTC device 110 and a MTC device connecting to the network for the first time is described as a new MTC device 100.

These MTC devices (new MTC device 100 and existing MTC devices 110) are provided with a 3GPP interface as a wireless access module, and can connect to the network (e.g., 3GPP network) 200 via an eNB 210, for example. In the network 200, a MME (Mobility Management Entity) 220, a SGW (Serving Gateway) 230 and a PGW (Packet Data Network Gateway) 240 exist to manage a connection state of the MTC devices and to establish or manage a necessary connection to access a MTC server 300. The MTC server 300 exists to manage these MTC devices, and the MTC server 300 provides a service to a MTC user 400 on the basis of various types of information reported from the MTC devices. As the wireless access module of the MTC devices, other wireless systems such as WiMAX and WLAN may be used, and the 3GPP interface is not a limiting one. Entities in the core network 200 shown in FIG. 1 represent functional blocks when LTE/SAE (Long Term Evolution/System Architecture Evolution) of 3GPP is used as a wireless access system, and these entities may be replaced with appropriate entity names having similar functions depending on a wireless access system used. For instance, when UMTS (Universal Mobile Telecommunication System) of 3GPP is used, the eNB 210 will be a RNC/BSC (Radio Network Controller/Base Station Controller), the MME 220 will be a SGSN (Serving GPRS Support Node), and the P-GW 240 will be a GGSN (Gateway GPRS Support Node). The MTC server 300 may be disposed in the 3GPP core network 200.

Figure 2:
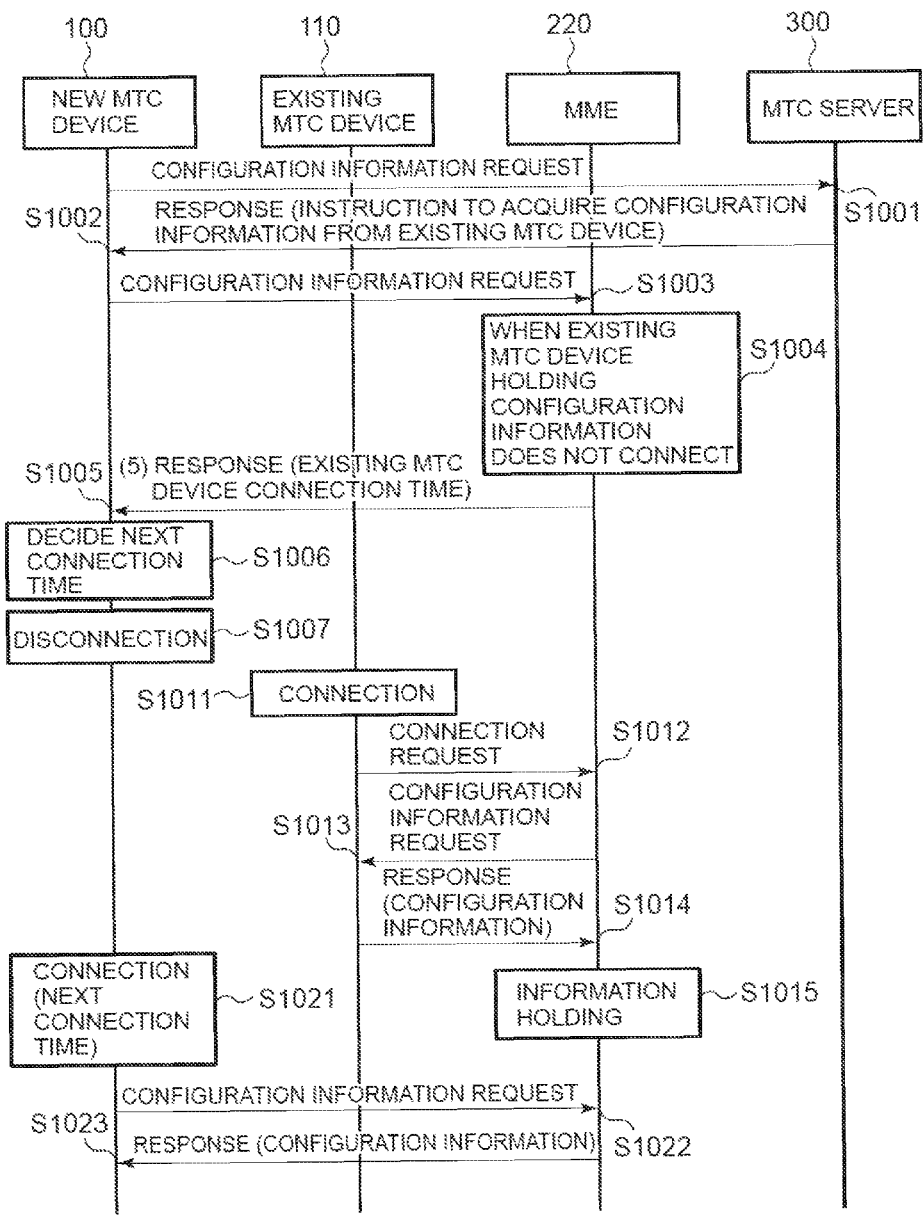
FIG. 2 is a sequence chart showing exemplary processing when a new MTC device connects to the network in Embodiment 1 of the present invention.

FIG. 2 is a sequence chart showing exemplary processing when the new MTC device 100 connects to the network in Embodiment 1 of the present invention. In FIG. 2, after connecting to the network 200, the new MTC device 100 transmits a message to request configuration information from the MTC server 300 (Step S1001). Receiving the request message, the MTC server 300 returns a response including information instructing to acquire configuration information from an existing MTC device 110 (Step S1002). When the MTC server 300 holds configuration information to be reported to the new MTC device 100, such configuration information may be included in a message relating to the response at Step S1002 for returning. For instance, the MTC server 300 may include static information that is not updated by an operation of an existing MTC device 110 in a message relating to the response at Step S1002 for returning.

Next, receiving the response, the new MTC device 100 receives the instruction from the MTC server and requests the configuration information that an existing MTC device 110 holds from the MME 220 (Step S1003).

Receiving the request, the MME 220 checks whether the existing MTC device 110 holding the configuration information connects or not to the network 200, and when the existing MTC device 110 connects, the MME 220 makes an inquiry to the existing MTC device 110 to acquire the configuration information.

Herein, the configuration information request that the MME 220 receives (Step S1003) may not be a message that the new MTC device 100 directly transmits to the MME 220 but a DDN (Downlink Data Notification) that the S-GW 230 receiving an information request message (data packet) transmitted from the new MTC device 100 to the existing MTC device 110 transmits. When the existing MTC device 110 as a destination of the received message does not connect to the network 200, the S-GW 230 transmits a DDN to the MME 220. The configuration information request that the MME 220 receives (Step S1003) may be an attach request that the new MTC device 100 transmits for a connection to the network 200. In this case, the new MTC device 100 may include identification information of the existing MTC device 110 as a request target of the information in an attach request message to be transmitted. When the MME 220 can already recognize that a correspondent node of the new MTC device 100 is the existing MTC device 110, the new MTC device 100 does not have to include identification information of the existing MTC device 110 in the attach request message. A method for the MME 220 to recognize a correspondent node of the new MTC device 100 includes inquiring about the correspondent node of the new MTC device 100 by transmitting a message to the MTC server 300 as the MME 220 receives the attach request or receiving a message from the MTC server 300 in advance, the message including identification information of the correspondent node of the new MTC device 100.

Herein when the existing MTC device 110 connects to the network 200, the same processing as a configuration information request at the below-described Step S1013 and a response at Step S1014 is performed between the MME 220 and the existing MTC device 110.

Then, configuration information of the existing MTC device 110 is included in a response at the below-described Step S1005, whereby the new MTC device 100 can acquire the configuration information of the existing MTC device 110. In the case of a method used where the new MTC device 100 transmits an information request message to the existing MTC device 110, when the existing MTC device 110 connects to the network 200, the S-GW 230 transfers the message to the existing MTC device 110. Therefore the existing MTC device 110 receives the message, and returns a response message to the new MTC device 100.

On the other hand, when the existing MTC device 110 does not connect to the network 200, the MME 220 notifies the new MTC device 100 of a time when the existing MTC device 110 holding configuration information connects to the network 200 next time (existing MTC device connection time) (Step S1005).

Herein, the case where Step S1004 is triggered by the DDN received from the S-GW 230 is described. When receiving a message to the existing MTC device 110 from the new MTC device 100 and when the existing MTC device 110 as a destination of the message does not connect to the network (idle state or detach state), the S-GW 230 transmits a DON (Downlink Data Notification) to the MME 220. Receiving this, when the MME 220 recognizes that the existing MTC device 110 does not connect or the existing MTC device 110 cannot connect, the MME 220 notifies the new MTC device 100 of a connection time of the existing MTC device 110 (Step S1005).

For instance, the MME 220 transmits paging to the existing MTC device 110 in accordance with the DDN received from the S-GW 230. When the existing MTC device 110 does not return a response to the paging, the MME 220 can determine that the new MTC device 100 is to be notified of time information. Alternatively, when the value of ARP (Allocation and Retention Priority) included in the received DDN is lower than a certain threshold, the MME 220 may determine that paging is not to be transmitted to the existing MTC device 110 and the new MTC device 100 is to be notified of time information. In this case, even during a time zone when the existing MTC device 110 can connect to the network 200 (can receive paging), when the ARP is low, the MME 220 can determine that paging is not to be transmitted. Thereby, traffic by a message of low priority can be reduced.

On the other hand, when the value of the ARP is high, the MME 220 determines that paging is to be transmitted to the existing MTC device 110. Further when timing of receiving the DDN to the existing MTC device 110 is outside the range of a connectable time interval of the existing MTC device 110, the MME 220 may determine that the new MTC device 100 is to be notified of time information. In this case, the MME 220 holds a time interval when the existing MTC device 110 can access. Moreover when the MME 220 is in a congestion state, the existing MTC device 110 cannot connect to the network 200, and therefore the MME 220 may determine that the new MTC device 100 is to be notified of time information.

The S-GW 230 includes identification information of the new MTC device 100 as a transmission source in the DDN, whereby the MME 220 can acquire the identification information of the new MTC device 100 as a notification target of time information. When the MME notifies the new MTC device 100 of time information, a response (DDN Acknowledge, DDN Failure Indication) to the DDN may be returned.

A method by the MME 220 to notify the new MTC device 100 of time information includes including by the MME 220 time information in a detach request message and transmitting the message to the new MTC device 100. Receiving the attach request transmitted by the new MTC device 100 and when the existing MTC device 110 can be specified as the correspondent node, the MME 220 may include time information in an attach reject message to reject the attach request and transmit the message to the new MTC device 100. The new MTC device 100 may include a value indicating priority (priority of its own device, priority of the correspondent node and priority of a message to be transmitted from now) in an attach request, whereby when the received attach request includes a value indicating low priority, the MME 220 may determine that an attach reject including time information is to be transmitted to the new MTC device 100. Thereby, traffic by a message of low priority can be reduced, and the new MTC device 100 is allowed to reconnect at timing when a message can be transmitted to the existing MTC device 110.

Herein the message that the MME 220 uses for a notification of time information may be any message capable of including time information. For instance, time information may be included in a NAS message such as an ESM information request or an Identification Request, a RRC message transmitted from a base station to a MTC device, or notice information reported to a MTC device (MIB: Master Information Block, SIB: System Information Block). When the notice information is used, the new MTC device connects to the network 200 at a time decided on the basis of the time information included in the notice information and transmits an information request message to the existing MTC device 110.

The MME 220 notifies the MTC server 300 of time information to be reported to the new MTC device 100, and then the MTC server 300 may transmit a message to the new MTC device 100, the message notifying of the time information. The MTC server 300 may include, in the message, information instructing the new MTC device 100 to disconnect from the network 200 once (corresponding to a detach request message). When acquiring time information included in the detach request received from the MME 220, the new MTC device 100 disconnects from the network 200 once and reconnects at timing calculated based on the time information. The MME 220 may notify of time information using any message other than the detach request. For instance, time information may be included in a message to release a PDN connection and a bearer that the new MTC device 100 has established, and such a message may be transmitted to the S-GW 230. In this case, the time information is delivered to the new MTC device 100 via the S-GW 230.

In that case, although the new MTC device 100 suspends an inquiry about the existing MTC device 110, the new MTC device 100 can continue a communication and processing with other MTC devices and the MTC server. When the re-connectable time calculated based on the received time information is close to the current time (within certain time duration), the new MTC device 100 determines not to disconnect from the network 200 but maintain the connection. On the other hand, when the next connection time is not close to the current time (later than a certain fixed time), the new MTC device 100 may determine to disconnect from the network 200 once. This determination may be made by the MME 220. That is, when the connection time of the existing MTC device 110 is later than a certain fixed time, the MME 220 determines to notify of the time information using a detach request or an attach reject in order to let the new MTC device 100 disconnect once. On the other hand, when the connection time of the existing MTC device 110 is within certain fixed time duration, the MME 220 determines to notify of time information using a message other than a detach request (e.g., an attach accept message). Herein, when the connection time of the existing MTC device 110 is within certain fixed time duration, instead of notifying the new MTC device 100 of time information, the MME 220 may instruct the new MTC device 100 to stand by while maintaining a connection to the network 200. Alternatively, the new MTC device 100 may be configured in advance to stand by for a certain fixed time to receive a response message after throwing an information request message to the existing MTC device 110. In this case, the MME 220 transmits paging again after the current time reaches an accessible time of the existing MTC device 110, and when receiving a response to the paging from the existing MTC device 110, the MME 220 returns, to the S-GW 230, a response to the DDN. As a result, the new MTC device 100 can receive a response message from the existing MTC device 110.

Receiving the notification on the time information of the existing MTC device 110, the new MTC device 100 decides a time later than the reported existing MTC device connection time as a next connection time (next connection time) (Step S1006), and disconnects the connection once (Step S1007). Note here that Step S1006 is not necessarily performed prior to disconnection and may be performed any time prior to the existing MTC device connection time. The MME 220 may notify the new MTC device 100 of, as the time information, not a value of a connection time of the existing MTC device 110 itself but duration until a starting time of an existing MTC device connection time or a time interval when the existing MTC device can access. That is, the MME 220 may refer to an accessible time interval of the existing MTC device 110 that the MME 220 itself holds and use duration from the current time to the starting time of the time interval.

In this case, the new MTC device 100 uses this duration as a back-off timer when the new MTC device 100 has to stand by from the reception of the message including the duration to reconnection. That is, the new MTC device 100 starts the timer when receiving this duration, and when the time indicated by the duration has elapsed, the new MTC device 100 reconnects to the network 200 and transmits an information request message to the existing MTC device 110.

The MME 220 notifies the new MTC device 100 of the existing MTC device connection time and stores the necessity of acquiring configuration information from the existing MTC device 110 as a request target of the configuration information when the existing MTC device 110 connects next time. Herein when the new MTC device 100 is configured to transmit an information request message to the existing MTC device 110 at the time of reconnection, the MME 220 does not necessarily have to store the necessity of acquiring information from the existing MTC device 110. However, when the MME 220 instructs the existing MTC device 110 to maintain the connection until an information request message from the new MTC device 100 is received, the MME 220 has to store the necessity.

The time information reported to the new MTC device 100 may be a time interval when the new MTC device 100 can access to the network 200 (time interval including a starting time as well as an ending time (or a starting time as well as duration) indicated by the aforementioned existing MTC device connection time). In this case, the new MTC device 100 can determine that, when the new MTC device 100 connects to the network 200 immediately after the start of the time interval or during the time interval, information can be directly acquired by transmitting a request message to the existing MTC device 110, and when the new MTC device 100 connects to the network 200 after the ending time has passed, information can be acquired from the MME 220.

Thereafter, at the next connection time, the existing MTC device 110 connects to the network 200 (Step S1011). This connection is, for example, for transmitting sensing data detected at the existing MTC device 110 to the MTC server 300 or receiving a message from the MTC server or other MTC devices. Herein, when the existing MTC device 110 transmits a connection request (attach request) to the MME 220, the MME 220 specifics this existing MTC device 110 as a request target of configuration information on the basis of this connection request, and requests the configuration information from this existing MTC device 110 (Step S1013). Receiving this request, the existing MTC device 110 transmits a response including the configuration information to the MME 220 (Step S1014). The MME 220 holds the configuration information included in the response (Step S1015).

Note here when the new MTC device 100 is configured to transmit an information request message to the existing MTC device 110 at the time of reconnection as described later, the MME 220 does not have to transmit an information request message to the existing MTC device 110 (Step S1013).

Then, the new MTC device 100 connects to the network 200 at the next connection time decided at Step S1006 (Step S1021), and transmits a request for configuration information to the MME 220 again (Step S1022). In response to this request for configuration information, the MME 220 reads the configuration information held at Step S1015, includes this configuration information in a response and transmits the response to the new MTC device 100 (Step S1023). Thereby, the new MTC device 100 can acquire the configuration information from the MME 220. Herein when the new MTC device 100 can directly access another MTC device, the new MTC device 100 can directly transmit an information request to the existing MTC device 110 at Step S1022. In this case, the MME 220 does not have to transmit an information request to the existing MTC device 110 (Step S1013).

In this case, the existing MTC device 110 has to connect to the network 200 to receive a request message from the new MTC device 100 even after information notification to the MTC server 300 has ended. To this end, when the existing MTC device 110 connects to the network 200 (Step S1011), the MME 220 may instruct the existing MTC device 110 to continuously connect to the network until the existing MTC device 110 receives a request message from the new MTC device 100. The notification of this instruction may be included in a response message (RRC Connection Reconfiguration) in response to a connection request (Attach Request or PDN connectivity Request) (Step S1012) that the new MTC device 100 transmits for a connection to the network 200. Alternatively, the notification may be performed by the MTC server 300 using a message transmitted to the existing MTC device 110, the MTC server 300 recognizing the existence of the new MTC device 100 requesting a communication with the new MTC device 100 based on the reception of the information request (Step S1001) from the new MTC device 100. Instead of notification of this instruction, the existing MTC device 110 may be configured to maintain a connection to the network during an accessible time interval.

The existing MTC device 110 transits to a reception-waiting state of paging transmitted from the MME 220, whereby the existing MTC device 110 may not maintain the connection to the network 200 or may not connect to the network 200 even at the next connection time. In this case, when the MME 220 receives a DDN addressed to the existing MTC device 110 from the S-GW 230, the MME 220 transmits paging to the existing MTC device 110. Then, the existing MTC device 110 responds to the paging, receives an information request message from the new MTC device 100 and transmits a response message to the new MTC device 100.

Herein, at Step S1004, as a method to specify the existing MTC device 110 to which the MME 220 makes an inquiry as a request target of configuration information, MTC device information held by the MME 220 may explicitly designate the existing MTC device 110 to which an inquiry is to be made. Alternatively, any one or a plurality of devices may be selected among the existing MTC devices 110. In that case, the existing MTC devices 110 preferably are selected from the same group as the new MTC device 100. Thereby effective information can be obtained from a device groups providing a common service or a device group having a common function. As another method, an existing MTC device 110 locating in the same area (tracking area) as the new MTC device 100 or a device locating at the geographically closest position (e.g., an existing MTC device 110 connected to the same base station) may be selected among the existing MTC devices 110. In this case, the new MTC device 100 notifies the MME 220 of its own current location information (positional information using GPS), a location where desired information exists or positional information on a position whose information is to be reported, and the MME 220 selects an existing MTC device 110 locating at a position closer to the positional information reported. Thereby configuration information matching with the environment of the location of the new MTC device 100 can be obtained.

Alternatively, among the existing MTC devices 110, an existing MTC device 110 connecting earlier to the network 200 may be selected or an optimum existing MTC device 110 may be selected on the basis of the past operation results and the accuracy of reported information. In this case, configuration information can be obtained on the basis of data through the operations (experiences and measurements) for a long time, plurality of existing MTC devices may be selected as an acquisition target of configuration information, whereby accuracy of the information can be increased, and recovery can be performed when the acquisition of information fails.

At Step S1002, the MTC server 300 may function as a server to manage information on each MTC device and notify the new MTC device 100 of identification information indicating the existing MTC device 110 holding configuration information. A server notifying the new MTC device 100 of identification information on the existing MTC device 110 to which the new MTC device 100 should make an inquiry may be an information management server existing separately from the MTC server 300. The MTC server 300 may specify an existing MTC device 110 using a similar method by the MME 220 to specify an existing MTC device 110 at Step S1004 as stated above. For instance, the new MTC device 100 transmits a message including positional information to the MTC server 300 (or an information management server). Then, the MTC server searches for a MTC device existing at a position closer to the reported positional information. Identification information on the existing MTC device 110 specified by the searching is returned to the new MTC device 100. The number of the existing MTC device 110 specified by the searching may be one or more.

Receiving a notification of the identification information of the existing MTC device 110, the new MTC device 100 notifies the MME 220 of the identification information of the existing MTC device 110 as an acquisition target of the configuration information to request the configuration information from the MME 220 (configuration information request at Step S1003), whereby the MME 220 can uniquely specify the existing MTC device 110 as an inquiry target. Acquiring the identification information of the existing MTC device 110, the new MTC device 100 may directly transmit an information request message at Step S1003 to the existing MTC device 110. In this case, as mentioned above, when the existing MTC device 110 does not connect to a base station (when a RRC connection is not established), the S-GW 230 transmits a DDN to the MME 220, and receiving this, the MME 220 notifies the new MTC device 100 of time information used for deciding the next connection time.

The identification information indicating the existing MTC device 110 may be acquired not only by a method of receiving a notification from the MTC server 300 or an information management server but also by any method. For instance, when the new MTC device 100 already holds identification information of the existing MTC device 110 as a request target of the information, there is no need to make an inquiry to the MTC server 300 at Step S1001. For instance, the new MTC device 110 may connect to another adjacent MTC device via a local communication and may acquire identification information of the existing MTC device 110. As a method for a connection to another MTC device, communication via a macro base station or a small base station (femto base station) or communication techniques such as UWB, WiMAX or WLAN (IEEE802.11a/b/g/n/p) may be used.

Identification information used for transmission of various messages may be any identifier that can specify a MTC device, such as an IP address, an ID assigned to a MTC device, an ID of a group made up of a plurality MTC devices, MSISDN (Mobile Subscriber Integrated Services Digital Network Number), IMSI (International Mobile Subscriber Identity), FQDN, SIP address, NAI (Network Access Identifier) and a new ID made by the combination of various types of information of terminals, and they are not limited to a specific one.

Although not shown, the existing MTC device 110 includes an accessible time interval registered beforehand as subscription information, or such information is already reported from the MME 220 or the MTC server 300, and so the existing MTC device 110 sets any time during the time interval as a next connection time. When the accessible time interval is reported from the network 200, the notification may be made using a protocol (e.g., OMA DM or (U)SIM OTA) for OAM (Operations, Administration and Maintenance). When the accessible time interval is reported from the MTC server 300, it may be included in a message exchanged between the MTC server 300 and the MTC devices. For instance, when the existing MTC devices 110 are configured so that each MTC device accesses continuously at the same time, the MME 220 can hold a connection time of each existing MTC device 110 (i.e., existing MTC device connection time). On the other hand, when each existing MTC device 110 selects a random time every time as a connection time from the accessible time interval, a next connection time may be reported at the time of information notification from the existing MTC device 110 to the MME 220 at Step S1012, for example, whereby the MME 220 can understand the next connection time of the existing MTC device 110. The existing MTC device 110 may notify the MTC server 300 of the next connection time, and the MTC server 300 further may notify the MME 220 of such. Instead of the accessible time interval, the MME 220 or the MTC server 300 notifies the existing MTC device 110 of the next connection time. When the MME 220 notifies the new MTC device 100 of the waiting time until the starting time of the accessible time interval of the existing MTC device 110 as stated above, there is no need for the existing MTC device 110 to notify the MME 220 of the next connection time. In this case, however, at the starting time of the accessible time interval, the existing MTC device 110 has to connect to the network 200 or has to be in a state of checking whether paging addressed to its own device exists or not.

The new MTC device 100 also may be configured to include an accessible time interval registered beforehand as subscription information, or when connecting to the network 200, an accessible time interval or a next connection time may be reported from the MME 220 or the MTC server 300. When it is reported from the MME 220, a response message at Step S1005 may include such information. When it is reported from the MTC server 300, a response message at Step S1002 may include such information.

Figure 3:
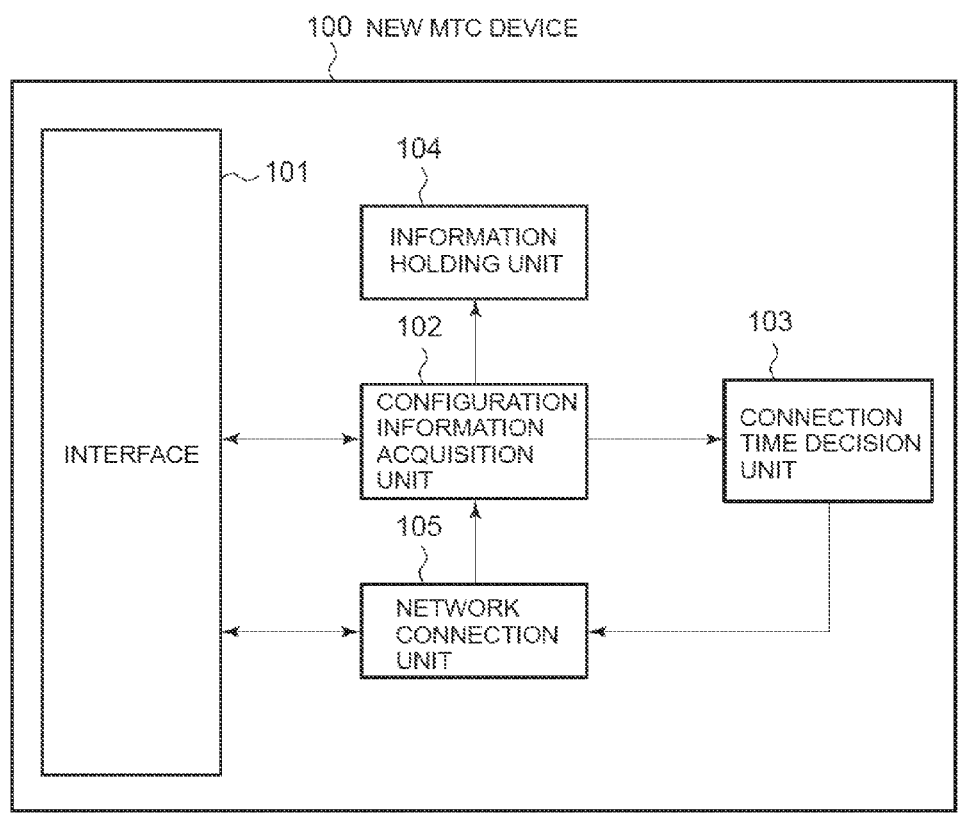
FIG. 3 is a block diagram showing an exemplary configuration of the new MTC device in Embodiment 1 of the present invention.

FIG. 3 is a block diagram showing an exemplary configuration of the new MTC device 100 in Embodiment 1 of the present invention. The new MTC device 100 shown in FIG. 3 includes an interface 101, a configuration information acquisition unit 102, a connection time decision unit 103, an information holding unit 104 and a network connection unit 105.

The interface 101 includes a lower layer protocol module directly related to an interface of the new MTC device 100. This lower layer protocol module is equipped with functions necessary to basic data communications such as mechanisms for signal modulation, encode compression, media access control and link layer control as well as functions of the entire physical layer and data link layer.

The configuration information acquisition unit 102 has a function of, when the new MTC device connects to the network 200, transmitting a message to request necessary configuration information from the MTC server 300 or the MME 220. When information is requested from the MTC server 300, a response message including information instructing to acquire configuration information from the existing MTC device 110 is received from the MTC server 300. On the other hand, when information is requested from the MME 220, connection time information (existing MTC device connection time) used by the new MTC device 100 to decide a time to connect to the network next time is acquired (when the MME 220 cannot acquire configuration information promptly), or requested configuration information is acquired (when the MME 220 can acquire configuration information from the existing MTC device 110 or holds such information). When the MTC server 300 notifies of the identification information of the existing MTC device 110 as an inquiry target, the new MTC device notifies the MME 220 of the identification information when requesting configuration information from the MME 220.

The connection time decision unit 103 has a function of deciding a time when the new MTC device 100 connects to the network next time (next connection time). When an existing MTC device connection time is acquired from the MME 220, the next connection time is set at a time later than the existing MTC device connection time. When an accessible time interval to the network 200 is designated, the next connection time is set within the time interval and at a time later than the existing MTC device connection time. When a waiting time until reconnection (Back-off Timer) is designated, the connection time decision unit 103 starts the timer when a message including the time and instructs the network connection unit 105 to reconnect after the received waiting time has elapsed.

The information holding unit 104 has a function of holding information acquired from the MTC server 300 or the MME 220 such as the existing MTC device connection time and an accessible time interval to the network 200 and the next connection time decided by the connection time decision unit 103, for example.

The network connection unit 105 has a function of executing processing to newly connect to the network 200 using the interface 101 and connection processing performed for a connection to the network 200 at the next connection time decided by the connection time decision unit 103.

Figure 4:
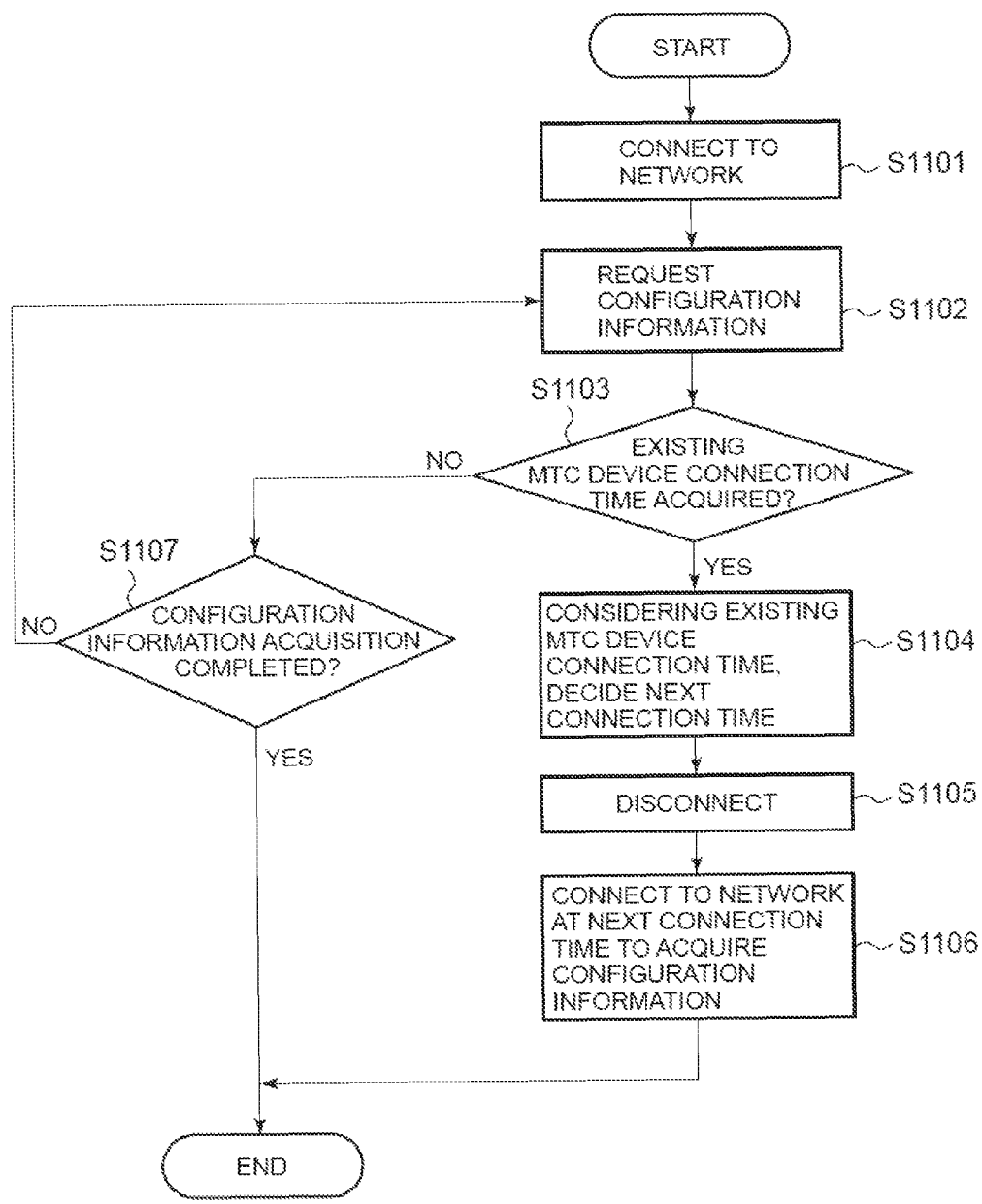
FIG. 4 is a flowchart showing exemplary processing performed after the new MTC device connects to the network in Embodiment 1 of the present invention.

FIG. 4 is a flowchart showing exemplary processing performed after the new MTC device 100 connects to the network 200 in Embodiment 1 of the present invention. In FIG. 4, when the configuration information acquisition unit 102 detects a connection of the new MTC device 100 to the network 200 (Step S1101), then the configuration information acquisition unit 102 transmits a message to request configuration information from the MME 220 (Step S1102). Although not shown, the configuration information acquisition unit 102 may transmit a message to request configuration information from the MTC server 300 prior to the processing at Step S1102. In this case, the configuration information acquisition unit 102 receives, from the MTC server 300, a response message including information instructing to acquire information from the existing MTC device 110.

Next, the new MTC device 100 receives a response message in response to the message requesting configuration information from the MME 220, and the configuration information acquisition unit 102 checks whether this response message includes or not an existing MTC device connection time (Step S1103). When the response message received from the MME 220 includes an existing MTC device connection time, the configuration information acquisition unit 102 passes the existing MTC device connection time to the connection time decision unit 103 and instructs the connection time decision unit 103 to decide a next connection time.

Figure 5:
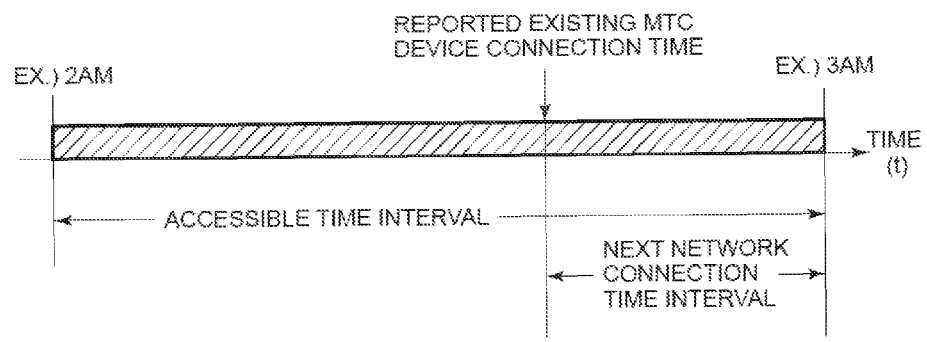
FIG. 5 schematically shows an exemplary access time interval or a MTC device in Embodiment 1 of the present invention.

In this case, the connection time decision unit 103 decides a next connection time on the basis of the existing MTC device connection time acquired from the configuration information acquisition unit 102. For instance as shown in FIG. 5, the connection time decision unit 103 sets a next connection time from a time interval later than the reported existing MTC device connection time (next network connection time interval). For instance, when all MTC devices included in FIG. 1 have a common time interval to access the network 200, the new MTC device 100 also, in general, sets any timing (random) in the time interval similarly to the existing MTC devices 110. On the other hand, the connection time decision unit 103 of the present invention sets a next connection time at any time in the accessible time interval to the network 200 and later than the acquired existing MTC device connection time. Herein, the accessible time interval to the network 200 is registered beforehand as subscription information in each MTC device, or is reported from the MME 220 or the MTC server 300.

After setting the next connection time, the connection time decision unit 103 issues an instruction of disconnection to the network connection unit 105, and the network connection unit 105 disconnects a connection to the network 200 (Step S1105). The disconnection from the network may be performed immediately after acquisition of the existing MTC device connection time.

Next, at the next connection time decided at Step S1104, the connection time decision unit 103 instructs the network connection unit 105 to connect to the network 200. Then, the network connection unit 105 notifies the configuration information acquisition unit 102 of completion of the connection to the network, and the configuration information acquisition unit 102 transmits a message to request configuration information from the MME 220 again, whereby configuration information that the MME 220 received at the timing of the existing MTC device connection timing from the existing MTC device 110 and holds can be acquired (Step S1106).

At Step S1103, when the response message does not include an existing MTC device connection time, the configuration information acquisition unit 102 checks whether the response message includes configuration information or not (Step S1107). When receiving a response message including configuration information from the MME 220, setting can be performed using this configuration information. On the other hand, when the response message does not include configuration information, acquisition of the configuration information is not completed, and therefore the procedure returns to Step S1102 to request configuration information.

In this way, the existing MTC device connection time is considered, whereby at timing after the existing MTC device 110 connects to the network 200 and the MME 220 acquires necessary configuration information, the new MTC device 100 can connect to the network 200. Accordingly, the new MTC device 100 can acquire the latest configuration information relating to an operation as its own MTC device at the same timing as the connection to the network 200 (connection for information notification to the MTC server 300), which can eliminate the necessity of a connection to the network 200 only for acquisition of configuration information. Further, the existing MTC devices 110 also reports configuration information at the same timing as a connection to the network 200 (connection for information notification to the MTC server 300), which can eliminate the necessity of a connection to the network 200 simply to transmit configuration information required by the new MTC device 100 to the network 200.

Figure 6:
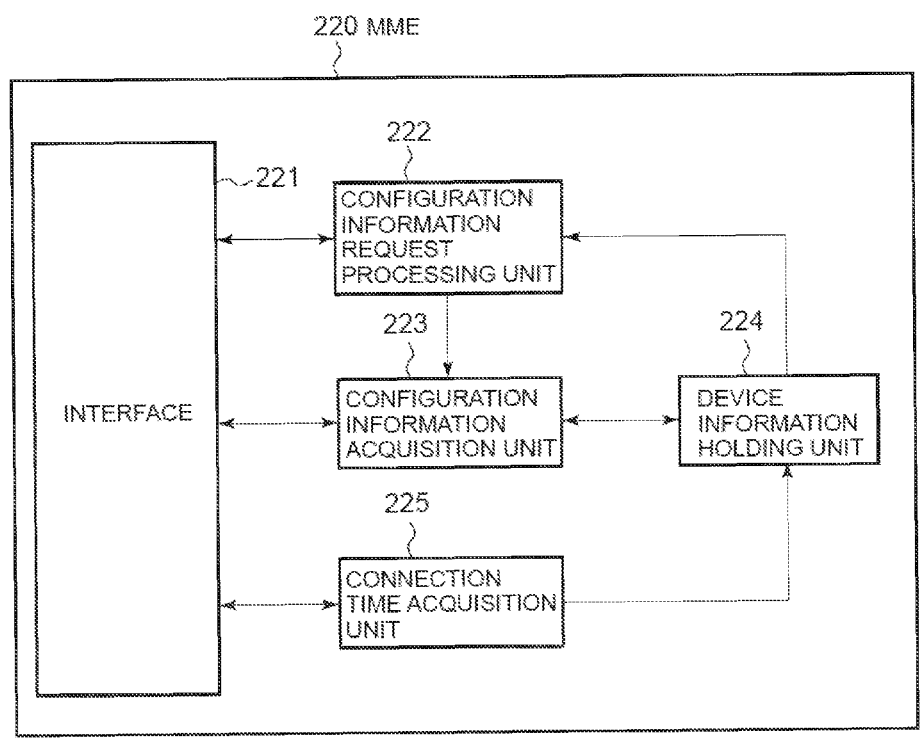
FIG. 6 is a block diagram showing an exemplary configuration of a MME in Embodiment 1 of the present invention.

FIG. 6 is a block diagram showing an exemplary configuration of the MME 220 in Embodiment 1 of the present invention. The MME 220 shown in FIG. 6 includes an interface 221, a configuration information request processing unit 222, a configuration information acquisition unit 223, a device information holding unit 224 and a connection time acquisition unit 225.

The interface 221 includes a lower layer protocol module directly related to an interface of the MME 220. This lower layer protocol module is equipped with functions necessary to basic data communications such as mechanisms for signal modulation, encode compression, media access control and link layer control as well as functions of the entire physical layer and data link layer.

The configuration information request processing unit 222 has a function of, when receiving a request message from the new MTC device 100, instructing the configuration information acquisition unit 223 to acquire configuration information to be reported to the new MTC device 100 from the existing MTC device 110. When identification information of the existing MTC device 110 as an inquiry target is reported from the new MTC device 100, the configuration information request processing unit 222 notifies the configuration information acquisition unit 223 of the identification information.

Figure 9:
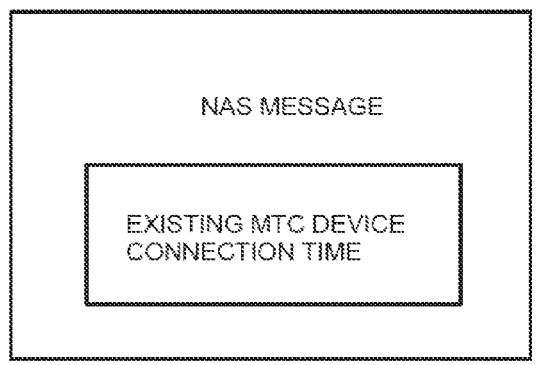
FIG. 9 shows an exemplary message enabling a notification of an existing MTC device connection time in Embodiment 1 of the present invention.

The configuration information acquisition unit 223 has a function of referring to the device information holding unit 224 to select an existing MTC device 110 holding configuration information that the new MTC device 100 wants and acquiring the configuration information from the selected existing MTC device 110. As a method to select the existing MTC device 110, various methods are available including a method of selecting a device connecting to the same base station as stated above, and the present invention is not limited to such methods. Further the configuration information acquisition unit 223 checks whether the existing MTC device 110 as a target of acquisition of configuration information connects to the network 200 or not. When the existing MTC device 110 connects to the network 200, the configuration information acquisition unit 223 makes an inquiry thereto to request the existing MTC device 110 to report the configuration information. On the other hand, when the existing MTC device 110 does not connect to the network 200, the configuration information acquisition unit 223 notifies the new MTC device 100 of a time when the existing MTC device 110 connects next time (existing MTC device connection time). Herein, the types of messages to notify the new MTC device 100 of the existing MTC device connection time are not limited especially. For instance, as shown in FIG. 9, a conventional NAS (Non-Access Stratum) message with the existing MTC device connection time inserted thereto may be transmitted. When the configuration information acquisition unit 223 already acquires configuration information from the existing MTC device 110 and holds the configuration information, the configuration information acquisition unit 223 notifies the new MTC device 100 of the held configuration information.

The device information holding unit 224 manages and holds, as information on existing MTC devices 110, connection or not to the network 200, information on a connection when they connect to the network, configuration information acquired from the existing MTC devices 110 and further an existing MTC device connection time of each existing MTC device 110, for example.

The connection time acquisition unit 225 has a function of, when receiving a message reporting the existing MTC device connection time transmitted from an existing MTC device 110, instructing the device information holding unit 224 to hold the existing MTC device connection time included in the message.

Note here that a method of acquiring the next connection time of the existing MTC device 110 (existing MTC device connection time) is not limited to the method of receiving a notification from the existing MTC device 110. For instance, when a connection time decided by each MTC device is continuously used in a cycle of 24 hours, the MME 220 may store a connection time when the existing MTC device 110 connects before, and may notify the new MTC device 100 of such a time as a next connection time. Herein when the number of times of the next connection of the existing MTC device 110 exceeds the number of times of continued use (e.g., when a connection time is used continuously twice, the next connection of the existing MTC device 110 using the connection time is the third time), the existing MTC device 110 notifies the MME 220 of the next (third time) connection time at the time of the second connection.

Figure 7:
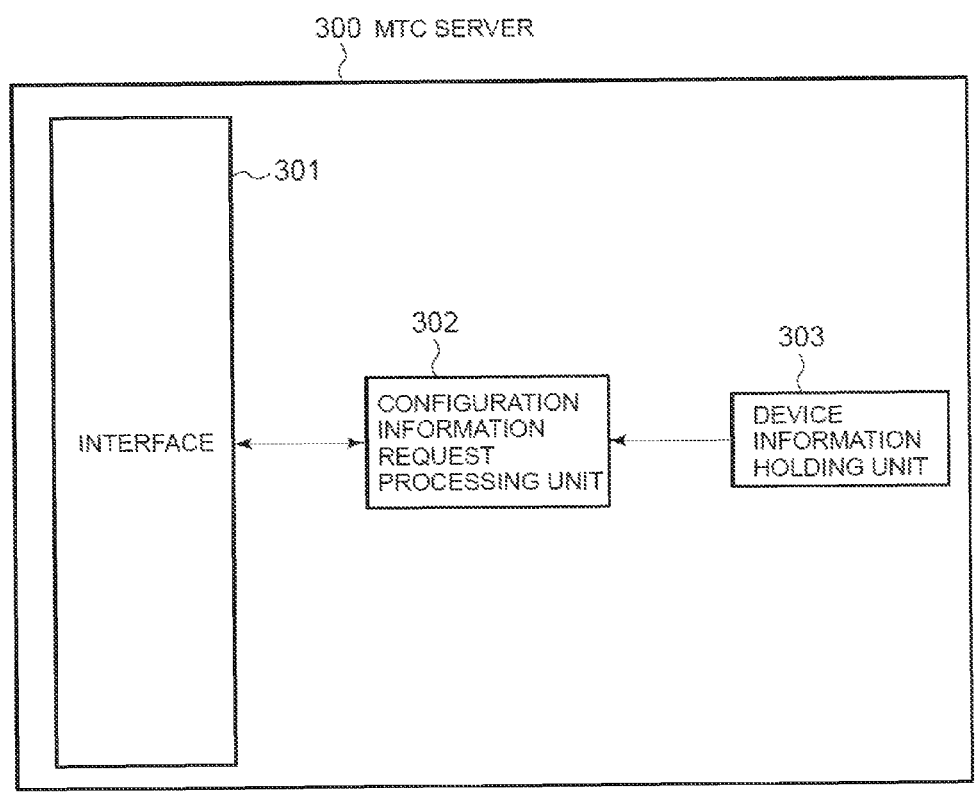
FIG. 7 is a block diagram showing an exemplary configuration of a MTC server in Embodiment 1 of the present invention.

FIG. 7 is a block diagram showing an exemplary configuration of the MTC server 300 in Embodiment 1 of the present invention. The MTC server 300 shown in FIG. 7 includes an interface 301, a configuration information request processing unit 302 and a device information holding unit 303.

The interface 301 includes a lower layer protocol module directly related to an interface of the MTC server 300. This lower layer protocol module is equipped with functions necessary to basic data communications such as mechanisms for signal modulation, encode compression, media access control and link layer control as well as functions of the entire physical layer and data link layer.

The configuration information request processing unit 302 has a function of, when receiving a request message for configuration information from the new MTC device 100, returning configuration information to be reported to the new MTC device 100 as well as a response message including information (information acquisition instruction) instructing to acquire configuration information from the existing MTC device 110.

The device information holding unit 303 holds, as information on existing MTC devices 110, information on devices such as access time interval designated for each MTC device, device IDs and group IDs. The device information holding unit 303 further holds static configuration information common to the MTC devices.

Figure 8:
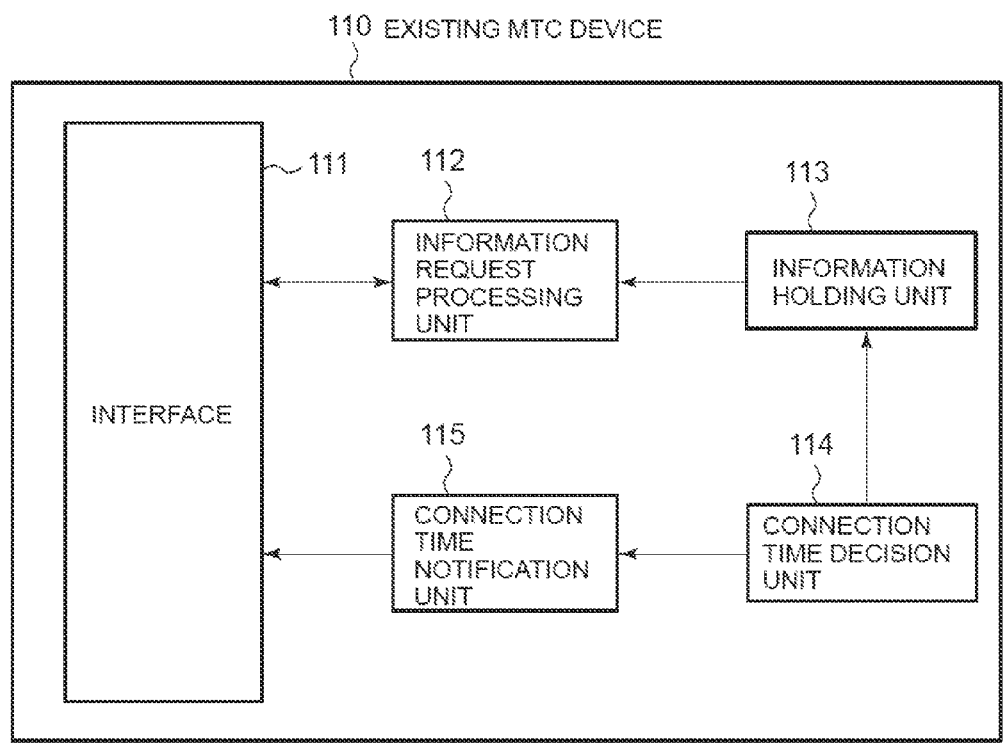
FIG. 8 is a block diagram showing an exemplary configuration of an existing MTC device in Embodiment 1 of the present invention.

FIG. 8 is a block diagram showing an exemplary configuration of the existing MTC device 110 in Embodiment 1 of the present invention. The existing MTC device 110 shown in FIG. 8 includes an interface 111, an information request processing unit 112, an information holding unit 113, a connection time decision unit 114, and a connection time notification unit 115.

The interface 111 includes a lower layer protocol module directly related to an interface of the existing MTC device 110. This lower layer protocol module is equipped with functions necessary to basic data communications such as mechanisms for signal modulation, encode compression, media access control and link layer control as well as functions of the entire physical layer and data link layer.

The information request processing unit 112 has a function of, when receiving a request message for configuration information from the MME 220, referring to the information holding unit 113 and returning configuration information held by the information holding unit 113 as a response to the MME 220.

The information holding unit 113 has a function of holding configuration information necessary for setting of MTCs and other various types of information.

The connection time decision unit 114 has a function of deciding a time when the existing MTC device 110 connects to the network 200 next time (next connection time). Herein when an accessible time interval to the network 200 is designated, the next connection time is set within the time interval.

The connection time notification unit 115 has a function of transmitting, to the MME 220, a message notifying of the next connection time decided by the connection time decision unit 114. Herein when the existing MTC devices 110 are configured to continuously access at the same time, the connection time decision unit 114 does not necessarily have to decide the next connection time and the connection time notification unit 115 does not necessarily have to notify of the next connection time.

In this Embodiment, the configuration of the MTC devices is described separately for the new MTC device 100 (shown in FIG. 3) and the existing MTC device 110 (shown in FIG. 8). However, since the new MTC device 100 will behave as the existing MTC device 110 after operating for a long time, and the existing MTC device 110 also may be a new MTC device 100 when it enters a new network. That is, the MTC devices may have the configuration of the new MTC device 100 shown in FIG. 3 and the configuration of the existing MTC device 110 shown in FIG. 8.

Herein as shown in FIG. 2, the new MTC device 100 makes an inquiry to the MTC server 300, thus recognizing the necessity to acquire configuration information from the existing MTC device 110. However, when the new MTC device 100 originally recognizes the necessity of acquiring configuration information from the existing MTC device 110 or the necessity of acquiring configuration information from the MME 220, the new MTC device 100 does not necessarily have to make an inquiry to the MTC server 300. That is, the new MTC device 100 may transmit a request for configuration information to the MME 220 irrespective of an instruction from the MTC server 300. In this case, although the MME 220 may specify an existing MTC device 110 as a target of the inquiry, when the new MTC device 100 holds information on the existing MTC devices 110 or can acquire information on the existing MTC devices 110 by making an inquiry to an information server (e.g., an ANDSF (Access Network Discovery & Selection Function) server) or the like, the new MTC device 100 may specify the existing MTC device 110 as an inquiry target and notify the MME 220 of the specified result (identification information on the existing MTC device 110). Further when the MME 220 recognizes the necessity of notifying the new MTC device 100 of information that the existing MTC device 110 holds, the MME 220 may notify the new MTC device 100 of an existing MTC device connection time without receiving a request message from the new MTC device 100.

The function held by the MME 220 in Embodiment 1 of the present invention may be held by the MTC server 300 for execution. That is, the operation described referring to FIG. 2, the configuration of the MME 220 shown in FIG. 6 and the configuration of the MTC server 300 shown in FIG. 7 may be implemented by one network node. In this case, receiving a request for configuration information from the new MTC device 100, when it is confirmed that the required configuration information cannot be acquired from the existing MTC device 110 holding the configuration information or that the existing MTC device 110 does not connect to the network 200, the MTC server 300 returns a next connection time of the existing MTC device 110 (time information) to the new MTC device 100. Then when the existing MTC device 110 connects to the network 200, the MTC server 300 requests the configuration information to acquire the necessary configuration information and when the new MTC device 100 connects to the network 200, the MTC server 300 notifies the new MTC device 100 of the held configuration information. Alternatively, when the new MTC device 100 reconnects to the network 200 on the basis of the time information acquired from the MTC server 300, the new MTC device 100 may transmit an information request message to the existing MTC device 110. At this time, even when the existing MTC device 110 does not connect to the network 200, when the existing MTC device 110 can receive paging, then the existing MTC device 110 receives paging from the MME 220. After connecting to the network 200, the existing MTC device 110 receives the information request message. Thereby the new MTC device 100 can acquire information from the existing MTC device 110.

The MME 220 in Embodiment 1 of the present invention may operate under instructions of the MTC server 300. That is, the MTC server 300 instructs the MME 220 about the existing MTC device connection time, whereby allocation to the new MTC device 100 is performed. Further the function held by the MME 220 in Embodiment 1 of the present invention may be held by another entity (SGW: Serving Gateway, PGW: Packet Data Gateway) in a 3GPP network for execution.

As described above, according to Embodiment 1 of the present invention, the new MTC device 100 can acquire configuration information that the existing MTC device 110 holds. When the new MTC device 100 requests configuration information and even when the existing MTC device 110 is not in a connection state, a network node (e.g., the MME 220) acquires configuration information when the existing MTC device 110 connects next time, and the new MTC device 100 sets a next connection time on the basis of the existing MTC device connection time, whereby the new MTC device 100 can securely acquire the configuration information of the existing MTC device 110. The new MTC device 100 and the existing MTC devices 110 do not connect to the network 200 simply for acquisition of configuration information or for provision of configuration information, and they acquire or provide configuration information at the time of regular connection to the network 200, and therefore power consumption can be minimized.

Embodiment 2

Next, the following describes Embodiment 2 of the present invention.

Embodiment 2 of the present invention is different from the aforementioned Embodiment 1 in the information reported from the MME 220 to the new MTC device 100, and the MME 220 reports a next connection time of the new MTC device 100.

Figure 10:
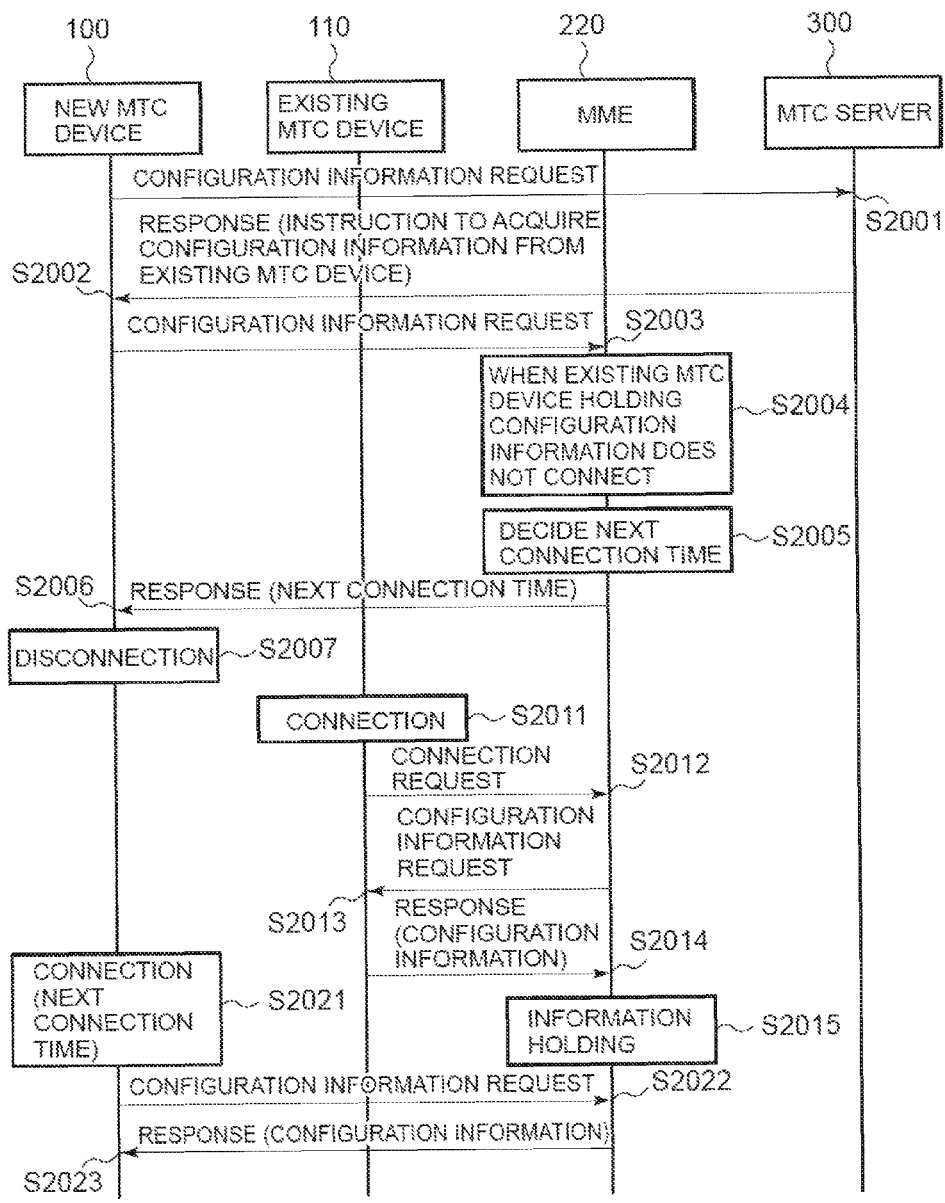
FIG. 10 is a sequence chart showing exemplary processing when a new MTC device 100 connects to the network in Embodiment 2 of the present invention.

Firstly referring to FIG. 10, the processing in Embodiment 2 of the present invention is described below. FIG. 10 is a sequence chart showing exemplary processing when the new MTC device 100 connects to the network in Embodiment 2 of the present invention. Steps S2001 to S2004 shown in FIG. 10 are the same as Steps S1001 to S1004 shown in FIG. 2, and their descriptions are omitted. Receiving a configuration information request from the new MTC device 100 (Step S2003), when it is found that the existing MTC device 110 holding configuration information does not connect to the network 200 (Step S2004), the MME 220 decides, as a next connection time of the new MTC device 100, an appropriate time later than a next connection time of the existing MTC device 110 (existing MTC device connection time) (Step S2005), and notifies the new MTC device 100 of the time (Step S2006). Receiving the notification of the next connection time, the new MTC device 100 decides to use the designated time as the next connection time and disconnects a connection once (Step S2007). Herein the MME 220 notifies the new MTC device 100 of the next connection time of the new MTC device 100 and stores the necessity of, when the existing MTC device 110 as a request target of the configuration information connects next time, acquiring the configuration information from the existing MTC device 110. Time information reported to the new MTC device 100 may be a time interval including the aforementioned starting time as well as an ending time (or a starting time and duration). In this case, the new MTC device can determine that when connecting to the network 200 within the time interval, information can be directly acquired by transmitting a request message to the existing MTC device, and when connecting to the network 200 after the elapse of the ending time, information can be acquired from the MME 220.

Thereafter at the next connection time of the existing MTC device 110 itself, the existing MTC device 110 connects to the network 200 (Step S2011), and at the next connection time of the new MTC device 100 reported from the MME 220, the new MTC device also connects to the network 200 (Step S2021). Herein Steps S2011 to S2015 and Steps S2021 to S2023 shown in FIG. 10 are the same as Steps 1011 to S1015 and Steps S1021 to S1023 shown in FIG. 2, and so their descriptions are omitted. Similarly to the aforementioned Embodiment 1 of the present invention, the MME 220 can acquire configuration information from the existing MTC device 110 and pass the configuration information to the new MTC device 100. Further similarly to the aforementioned Embodiment 1 of the present invention, when the new MTC device 100 can directly access another MTC device, the new MTC device 100 can directly transmit an information request to the existing MTC device 110 at Step S2022. In this case, the existing MTC device 110 has to connect to the network 200 to receive a request message from the new MTC device 100 even after information notification to the MTC server 300 has ended. To this end, when the existing MTC device 110 connects to the network 200 (Step S2011), the MME 220 may instruct the existing MTC device 110 to continuously connect to the network until the existing MTC device 110 receives a request message from the new MTC device 100.

In this way, the new MTC device 100 uses the next connection time of the new MTC device 100 decided by the MME 220, whereby the new MTC device 100 just has to reconnect to the reported next connection time, and so load on the new MTC device 100 can be reduced. Further at timing after the existing MTC device 110 connects to the network 200 and the MME 220 acquires necessary information therefrom, the new MTC device 100 can connect to the network 200. Therefore, the new MTC device 100 can acquire the latest configuration information relating to an operation as its own MTC device at the same timing as the connection to the network 200 (connection for information notification to the MTC server 300), which can eliminate the necessity of a connection to the network 200 only for acquisition of configuration information. Further, the existing MTC devices 110 also reports configuration information at the same timing as a connection to the network 200 (connection for information notification to the MTC server 300), which can eliminate the necessity of a connection to the network 200 simply to transmit configuration information required by the new MTC device 100 to the network 200.

Next, the following describes the configuration of the new MTC device 100 in Embodiment 2 of the present invention. In the following, referring to the configuration of the new MTC device 100 shown in FIG. 3, the configuration of the new MTC device 100 in Embodiment 2 of the present invention is described.

The interface 101 includes a lower layer protocol module directly related to an interface of the new MTC device 100. This lower layer protocol module is equipped with functions necessary to basic data communications such as mechanisms for signal modulation, encode compression, media access control and link layer control as well as functions of the entire physical layer and data link layer.

The configuration information acquisition unit 102 has a function of, when the new MTC device connects to the network 200, transmitting a message to request necessary configuration information from the MTC server 300 or the MME 220. When information is requested from the MTC server 300, a response message including information instructing to acquire configuration information from the existing MTC device 110 is received from the MTC server 300. On the other hand, when information is requested from the MME 220, a connection time (next connection time) when the new MTC device 100 reconnects to the network 200 next time or requested configuration information is acquired. When the MTC server 300 notifies of the identification information of the existing MTC device 110 as an inquiry target, the new MTC device notifies the MME 220 of the identification information when requesting configuration information from the MME 220.

The connection time decision unit 103 has a function of deciding a time when the new MTC device 100 connects to the network next time (next connection time). When the next connection time is acquired from the MME 220, the connection time decision unit 103 decides to use such a next connection time as it is.

The information holding unit 104 holds information such as an accessible time interval to the network 200 and the next connection time decided by the connection time decision unit 103. Herein, the accessible time interval to the network 200 is registered beforehand as subscription information in each MTC device, or is reported from the MME 220 or the MTC server 300.

The network connection unit 105 has a function of executing connection processing to newly connect to the network 200 using the interface 101 and to connect to the network 200 at the next connection time decided by the connection time decision unit 103.

Figure 11:
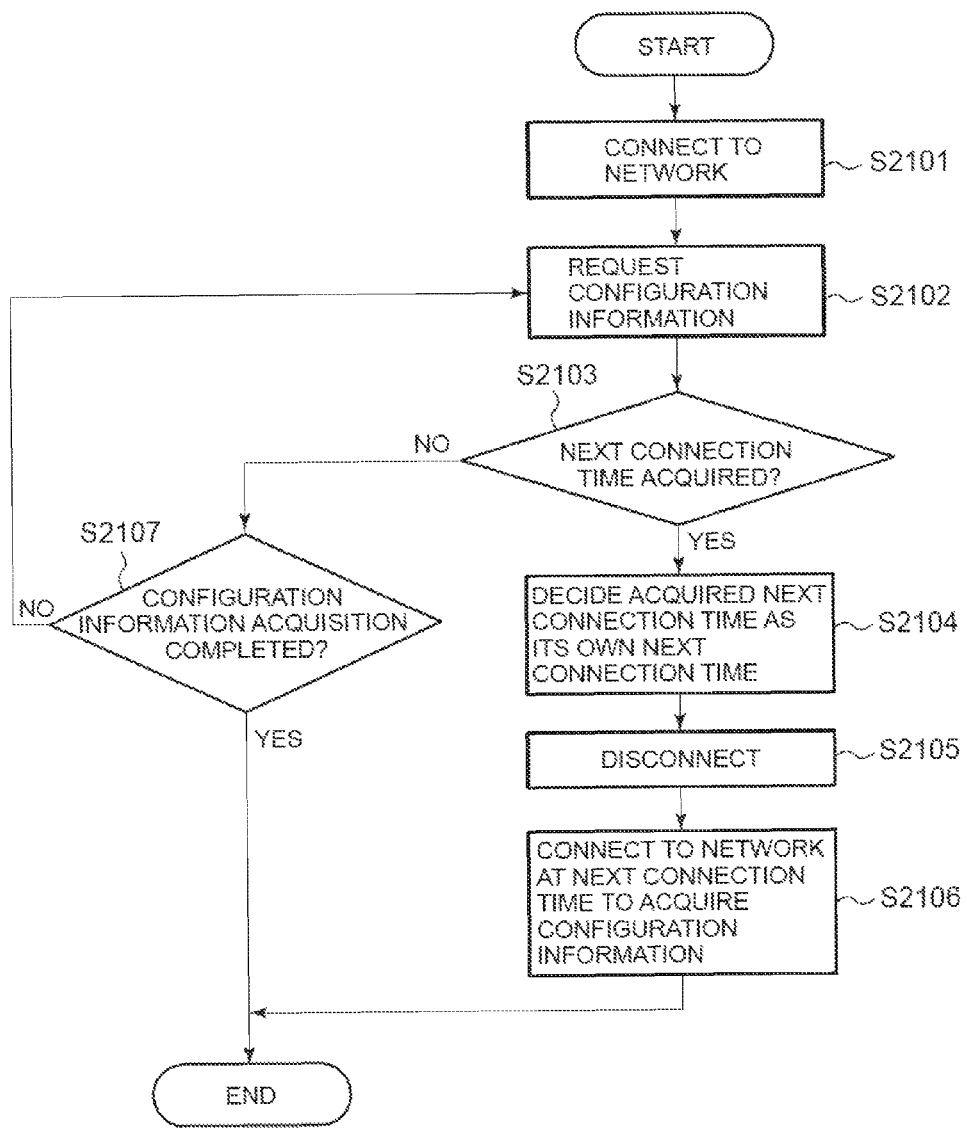
FIG. 11 is a flowchart showing exemplary processing performed after the new MTC device connects to the network in Embodiment 2 of the present invention.

FIG. 11 is a flowchart showing exemplary processing performed after the new MTC device 100 connects to the network 200 in Embodiment 2 of the present invention. Processing at Steps S2101, S2102, S2105, S2106 and S2107 shown in FIG. 11 are the same as the processing at Steps S1101, S1102, S1105, S1106 and S1107 shown in FIG. 4, and so their descriptions are omitted. The processing at Steps S2103 and S2104 shown in FIG. 11 represent a feature of the processing in Embodiment 2 of the present invention.

At Step S2103 of FIG. 11, the new MTC device 100 receives, from the MME 220, a response message in response to a message requesting configuration information, and the configuration information acquisition unit 102 checks whether this response message includes a next connection time or not (Step S2103). When the response message received from the MME 220 includes a next connection time, the next connection time is passed to the connection time decision unit 103 to instruct the connection time decision unit 103 to decide a next connection time.

In this case, the connection time decision unit 103 decides the next connection time acquired from the configuration information acquisition unit 102 as a next connection time when the new MTC device 100 itself connects. Since this next connection time is decided by the MME 220 so as to be later than a time when the existing MTC device 110 connects (existing MTC device connection time), the new MTC device 100 connects to the network 200 at this next connection time, whereby the new MTC device 100 can acquire configuration information of the existing MTC device 110 from the MME 220.

Figure 12:
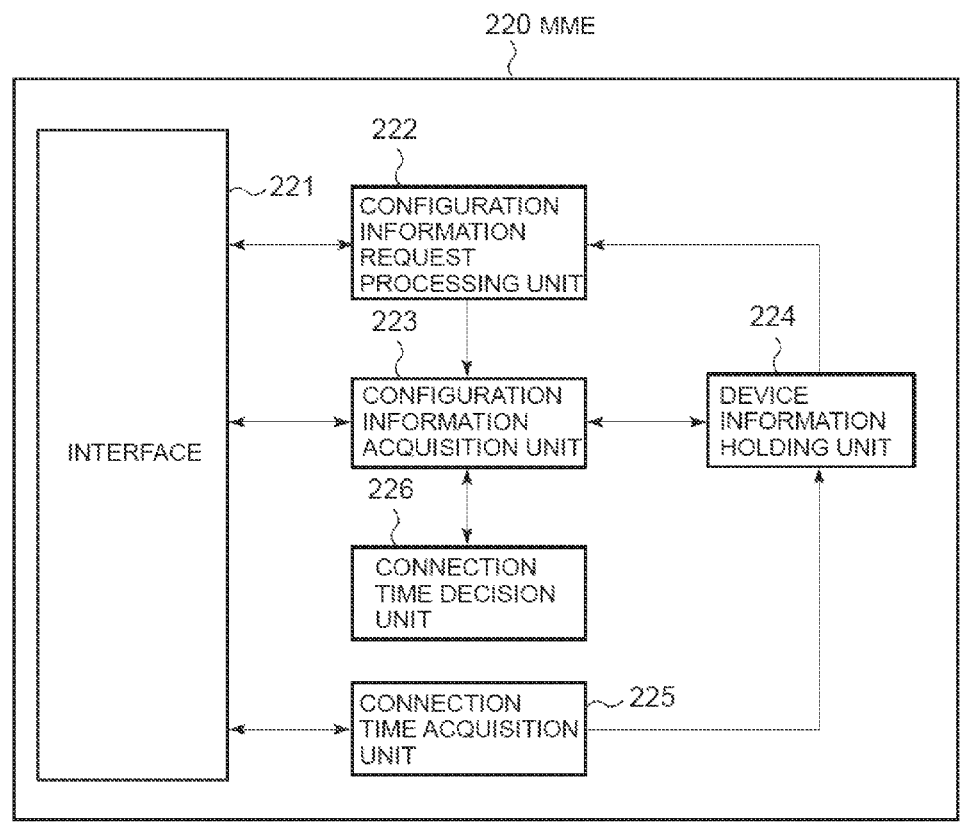
FIG. 12 is a block diagram showing an exemplary configuration of a MME in Embodiment 2 of the present invention.

FIG. 12 is a block diagram showing an exemplary configuration of the MME 220 in Embodiment 2 of the present invention. The MME 220 shown in FIG. 12 includes an interface 221, a configuration information request processing unit 222, a configuration information acquisition unit 223, a device information holding unit 224 and a connection time acquisition unit 225.

The interface 221 includes a lower layer protocol module directly related to an interface of the MME 220. This lower layer protocol module is equipped with functions necessary to basic data communications such as mechanisms for signal modulation, encode compression, media access control and link layer control as well as functions of the entire physical layer and data link layer.

The configuration information request processing unit 222 has a function of, when receiving a request message from the new MTC device 100, instructing the configuration information acquisition unit 223 to acquire configuration information to be reported to the new MTC device 100 from the existing MTC device 110. When identification information of the existing MTC device 110 as an inquiry target is reported from the new MTC device 100, the configuration information request processing unit 222 notifies the configuration information acquisition unit 223 of the identification information.

The configuration information acquisition unit 223 has a function of referring to the device information holding unit 224 to select an existing MTC device 110 holding configuration information that the existing MTC device 110 wants and acquiring the configuration information from the selected existing MTC device 110. Further the configuration information acquisition unit 223 has a function of checking whether the selected existing MTC device 110 connects to the network 200 or not. When the existing MTC device 110 connects to the network 200, the configuration information acquisition unit 223 makes an inquiry to the existing MTC device 110 to request to report the configuration information. On the other hand, when the existing MTC device 110 does not connect to the network 200, the configuration information acquisition unit 223 notifies a connection time decision unit 226 of a time when the existing MTC device 110 connects next time (existing MTC device connection time) and instructs the connection time decision unit 226 to decide a next connection time of the new MTC device 100.

The connection time decision unit 226 has a function of deciding an appropriate time later than the existing MTC device connection time reported from the configuration information acquisition unit 223. The connection time decision unit 226 notifies the configuration information acquisition unit 223 of the decided time and the configuration information acquisition unit 223 notifies the new MTC device 100 of the time as a next connection time of the new MTC device 100.

The device information holding unit 224 manages and holds, as information on existing MTC devices 110, connection or not to the network 200, information on a connection when they connect to the network, configuration information acquired from the existing MTC devices 110 and further an existing MTC device connection time of each existing MTC device 110, for example.

The connection time acquisition unit 225 has a function of, when receiving a message reporting the existing MTC device connection time transmitted from an existing MTC device 110, instructing the device information holding unit 224 to hold the existing MTC device connection time included in the message.

Similarly to Embodiment 1 of the present invention, a method of acquiring the next connection time of the existing MTC device 110 (existing MTC device connection time) is not limited to the method of receiving a notification from the existing MTC device 110. For instance, when a connection time decided by each MTC device is continuously used in a cycle of 24 hours, the MME 220 may store a connection time when the existing MTC device 110 connects before and set the time as a next connection time, and the connection time decision unit 226 may decide a next connection time of the new MTC device 100 to be later than the time. Herein when the number of times of the next connection of the existing MTC device 110 exceeds the number of times of continued use (e.g., when a connection time is used continuously twice, the next connection of the existing MTC device 110 using the connection time is the third time), the existing MTC device 110 notifies the MME 220 of the next (third time) connection time at the time of the second connection.

Since the configuration of the MTC server 300 in Embodiment 2 of the present invention is similar to the configuration (shown in FIG. 7) of the MTC server 300 in Embodiment 1 of the present invention, the description therefor is omitted.

Herein as shown in FIG. 10, the new MTC device 100 makes an inquiry to the MTC server 300, thus recognizing the necessity to acquire configuration information from the existing MTC device 110. However, when the new MTC device 100 originally recognizes the necessity of acquiring configuration information from the existing MTC device 110 or the necessity of acquiring configuration information from the MME 220, the new MTC device 100 does not necessarily have to make an inquiry to the MTC server 300. That is, the new MTC device 100 may transmit a request for configuration information to the MME 220 irrespective of an instruction from the MTC server 300. In this case, although the MME 220 may specify an existing MTC device 110 as a target of the inquiry, when the new MTC device 100 holds information on the existing MTC devices 110 or can acquire information on the existing MTC devices 110 by making an inquiry to an information server (e.g., an ANDSF server) or the like, the new MTC device 100 may specify the existing MTC device 110 as an inquiry target and notify the MME 220 of the specified result (identification information on the existing MTC device 110). Further when the MME 220 recognizes the necessity of notifying the new MTC device 100 of information that the existing MTC device 110 holds, the MME 220 may notify the new MTC device 100 of an existing MTC device connection time without receiving a request message from the new MTC device 100.

The function held by the MME 220 in Embodiment 2 of the present invention may be held by the MTC server 300 for execution. That is, the configuration of the MME 220 shown in FIG. 12 and the configuration of the MTC server 300 shown in FIG. 7 may be implemented by one network node. In this case, receiving a request for configuration information from the new MTC device 100, when it is confirmed that the required configuration information cannot be acquired from the existing MTC device 110 holding the configuration information or that the existing MTC device 110 does not connect to the network 200. the MTC server 300 passes a next connection time of the new MTC device 100 to the new MTC device 100. Then when the existing MTC device 110 connects to the network 200, the MTC server 300 requests the configuration information to acquire the necessary configuration information and when the new MTC device 100 connects to the network 200, the MTC server 300 notifies the new MTC device 100 of the held configuration information. The MME 220 in Embodiment 2 of the present invention may operate under instructions of the MTC server 300. That is, the MTC server 300 instructs the MME 220 about the next connection time, whereby allocation to the new MTC device 100 is performed. Further the function held by the MME 220 in Embodiment 2 of the present invention may be held by another entity (SGW: Serving Gateway, PGW: Packet Data Gateway) in a 3GPP network for execution. Except for the function by the MME 220 of deciding the next connection time of the new MTC device 100 as a feature of Embodiment 2 of the present invention, various functions described in Embodiment 1 of the present invention are applicable to Embodiment 2 of the present invention as well.

As described above, according to Embodiment 2 of the present invention, the new MTC device 100 can acquire configuration information that the existing MTC device 110 holds. When the new MTC device 100 requests configuration information and even when the existing MTC device 110 is not in a connection state, a network node (e.g., the MME 220) acquires configuration information when the existing MTC device 110 connects next time, and the new MTC device 100 sets a next connection time reported from the network node, whereby the new MTC device 100 can securely acquire the configuration information of the existing MTC device 110. The new MTC device 100 and the existing MTC devices 110 do not connect to the network 200 simply for acquisition of configuration information or for provision of configuration information, and they acquire or provide configuration information at the time of regular connection to the network 200, and therefore power consumption can be minimized.

Embodiment 3

Next, the following describes Embodiment 3 of the present invention.

Embodiment 3 of the present invention is different from the aforementioned Embodiment 1 and Embodiment 2 in the information reported from the MME 220 to the new MTC device 100, and the MME 220 separately designates an accessible time interval for the existing MTC device 110 and an accessible time interval for the new MTC device 100.

Figure 13:
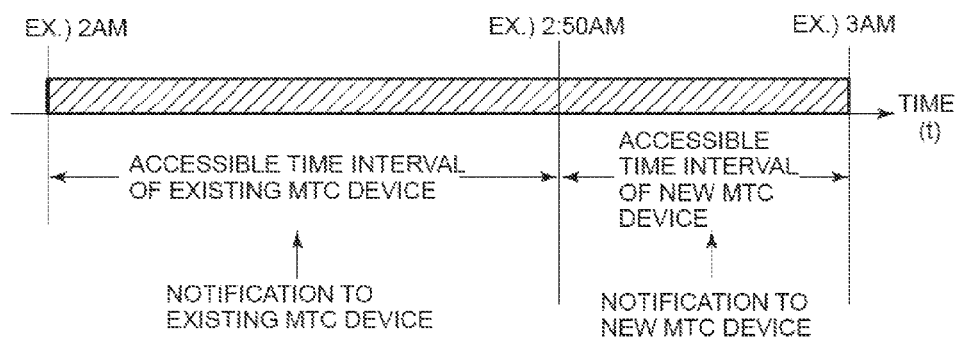
FIG. 13 schematically shows exemplary time intervals designated by the MME to the new MTC device and the existing MTC device in Embodiment 3 of the present invention.
Figure 17:
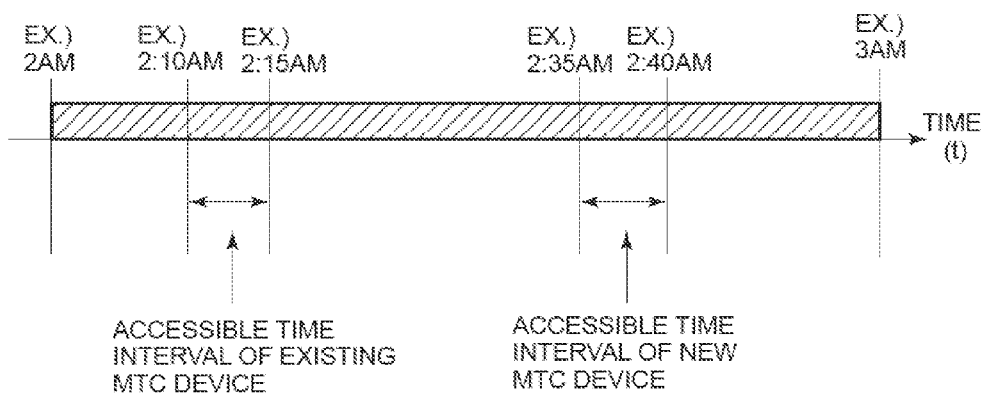
FIG. 17 schematically shows an exemplary access time interval of a MTC device in Embodiment 3 of the present invention.

FIG. 13 shows exemplary time intervals designated by the MME 220 for the new MTC device 100 and the existing MTC device 110 in Embodiment 3 of the present invention. As shown in FIG. 13, when duration from 2 AM to 3 AM is allocated as an accessible time interval as a whole (a time zone in which access by MTC devices belonging to a certain group are permitted), for instance, duration from 2 AM to 2:50 AM is reported as an accessible time interval (time zone) for the existing MTC device 110, and duration from 2:50 AM to 3 AM is set as an accessible time interval (time zone) for the new MTC device 100. That is, two continuous time intervals are set so that following a connection of the existing MTC device 110 to the network 200, the new MTC device 100 connects to the network 200. Herein, the accessible time intervals allocated to the new MTC device 100 and the existing MTC device 110 are preferably time intervals within a range of the common accessible time interval originally allocated to these MTC devices. Thereby, the MME 220 or the MTC server 300 can eliminate the influences on MTC devices of other users to which other time intervals (e.g., duration from 3 AM to 4 AM) or allocated. Further as shown in FIG. 17, the accessible time intervals allocated to the new MTC device 100 and the existing MTC device 110 are not necessarily continuous as long as the accessible time interval for a MTC device holding information is set prior to the accessible time interval for a MTC requiring the information. As for how long the former time interval precedes, a time interval common to all priority notification information may be used, or it may be determined based on information to be reported. In the latter case, the MME 220 may refer to a priority notification information list and use a change time corresponding to each piece of priority information included in the list.

Figure 14:
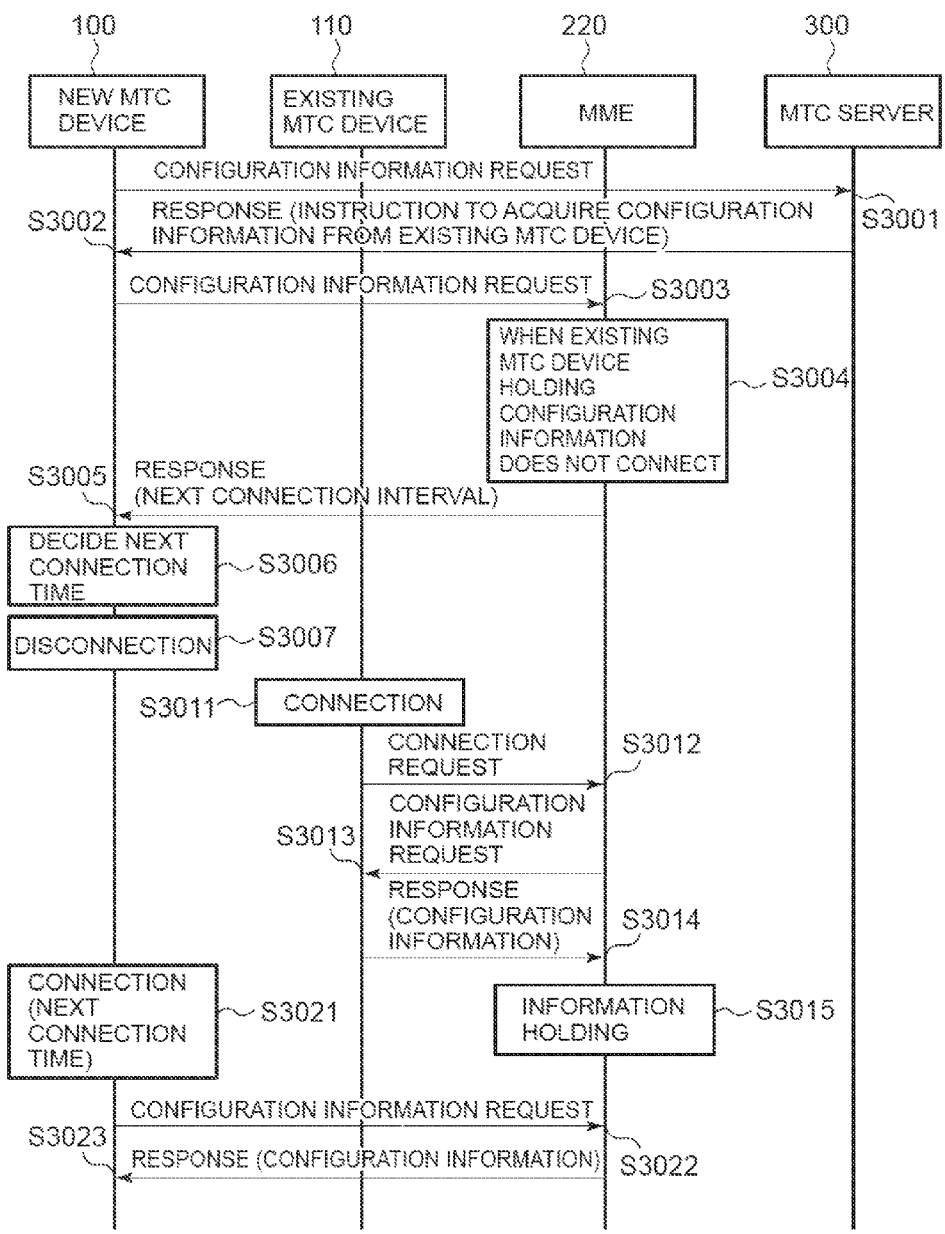
FIG. 14 is a sequence chart showing exemplary processing when a new MTC device connects to the network in Embodiment 3 of the present invention.

Firstly referring to FIG. 14, the processing in Embodiment 3 of the present invention is described below. FIG. 14 is a sequence chart showing exemplary processing when the new MTC device 100 connects to the network in Embodiment 3 of the present invention. Steps S3001 to S3004 shown in FIG. 14 are the same as Steps S1001 to S1004 shown in FIG. 2, and their descriptions are omitted. Receiving a configuration information request from the new MTC device 100 (Step S3003), when it is found that the existing MTC device 110 holding configuration information does not connect to the network 200 (Step S3004), the MME 220 notifies the new MTC device 100 of an accessible time interval (next connection interval) for the new MTC device 100 (Step S5). Receiving the notification of the next connection interval, the new MTC device 100 decides any time in the next connection time as a next access time (connection time) (Step S3006) and disconnects a connection once (Step S3007). Herein Step S3006 is not necessarily performed prior to the disconnection and may be performed at any time prior to the starting time of the next connection interval. The MME 220 notifies the new MTC device 100 of the next connection interval of the new MTC device 100 and stores the necessity of, when the existing MTC device 110 as a request target of the configuration information connects next time, acquiring the configuration information from the existing MTC device 110.

Thereafter at the next connection time of the existing MTC device 110 itself, the existing MTC device 110 connects to the network 200 (Step S3011), and at the next connection time of the new MTC device 100 reported from the MME 220, the new MTC device also connects to the network 200. Herein the accessible time interval for the existing MTC device 110 is already allocated to the existing MTC device 110. For instance, the accessible time interval may be registered beforehand as subscription information of the existing MTC device 110, or may be reported from the MME 220 or the MTC server 300 when connecting to the network 200. Herein Steps S3011 to S3015 and Steps S3021 to S3023 shown in FIG. 14 are the same as Steps S1011 to S1015 and Steps S1021 to S1023 shown in FIG. 2, and so their descriptions are omitted. Similarly to the aforementioned Embodiment 1 of the present invention, the MME 220 can acquire configuration information from the existing MTC device 110 and pass the configuration information to the new MTC device 100.

Next, the following describes the configuration of the new MTC device 100 in Embodiment 3 of the present invention. In the following, referring to the configuration of the new MTC device 100 shown in FIG. 3, the configuration of the new MTC device 100 in Embodiment 3 of the present invention is described.

The interface 101 includes a lower layer protocol module directly related to an interface of the new MTC device 100. This lower layer protocol module is equipped with functions necessary to basic data communications such as mechanisms for signal modulation, encode compression, media access control and link layer control as well as functions of the entire physical layer and data link layer.

The configuration information acquisition unit 102 has a function of, when the new MTC device connects to the network 200, transmitting a message to request necessary configuration information from the MTC server 300 or the MME 220. When information is requested from the MTC server 300, a response message including information instructing to acquire configuration information from the existing MTC device 110 is received from the MTC server 300. On the other hand, when information is requested from the MME 220, an accessible connection interval when the new MTC device 100 reconnects to the network 200 next time or requested configuration information is acquired. When the MTC server 300 notifies of the identification information of the existing MTC device 110 as an inquiry target, the new MTC device notifies the MME 220 of the identification information when requesting configuration information from the MME 220. The accessible time interval when reconnecting to the network 200 may be registered in each MTC device beforehand as subscription information. Further, the accessible time interval when reconnecting to the network 200 may be registered in subscription information as an accessible time interval to be used when the new MTC device 100 connects to the network 200 for the first time. In this case, the new MTC device can acquire necessary information at the time of the first connection to the network 200.

The connection time decision unit 103 has a function of setting any time in the accessible time interval for the new MTC device 100 acquired from the MME 220 as a next connection time. The next connection time may be decided randomly as long as it is within the accessible time interval for the new MTC device 100.

The information holding unit 104 holds information such as the accessible time interval for the new MTC device 100 acquired from the MTC server 300 or the MME 220 and the next connection time decided by the connection time decision unit 103.

The network connection unit 105 has a function of executing connection processing to newly connect to the network 200 using the interface 101 and to connect to the network 200 at the next connection time decided by the connection time decision unit 103.

Figure 15:
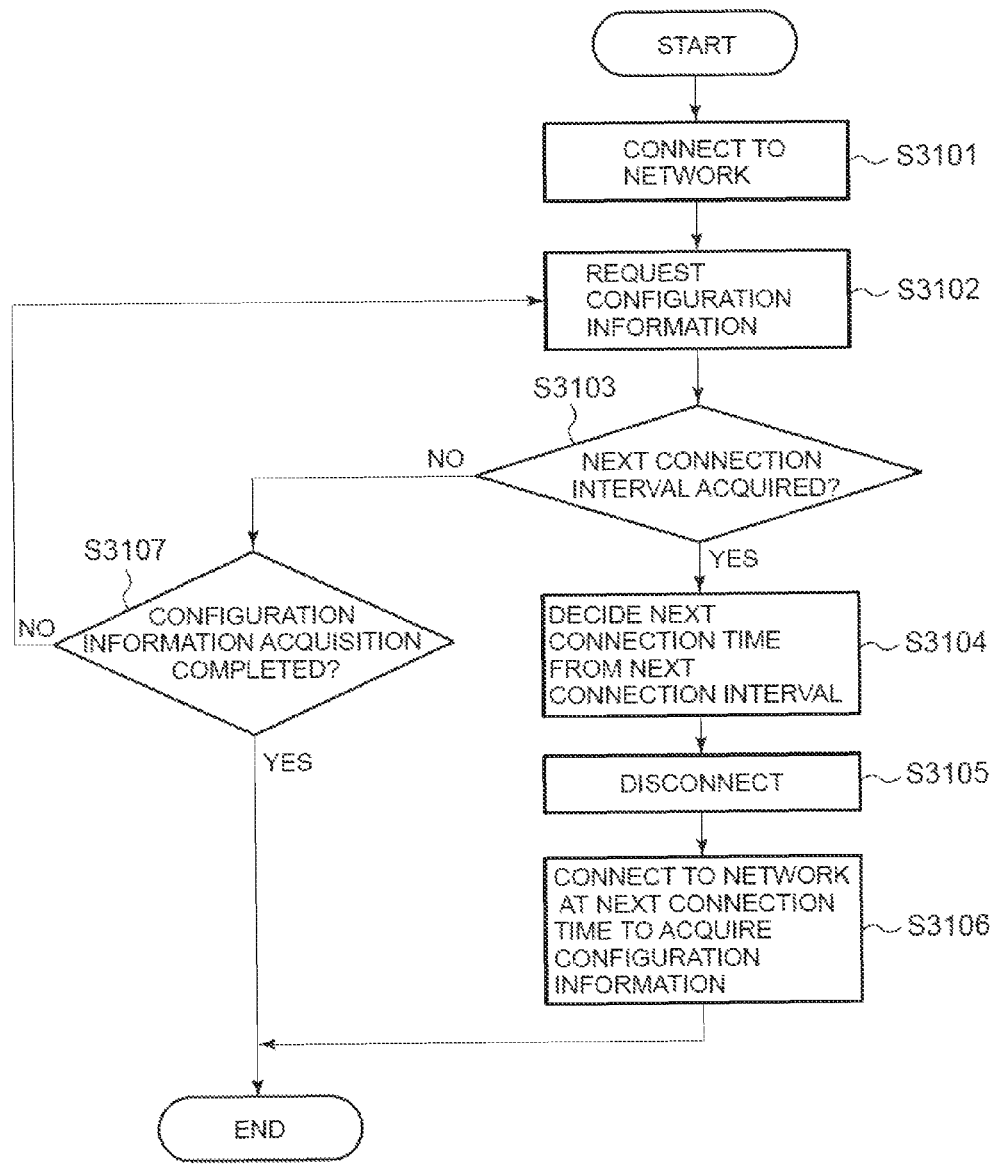
FIG. 15 is a flowchart showing exemplary processing performed after the new MTC device connects to the network in Embodiment 3 of the present invention.

FIG. 15 is a flowchart showing exemplary processing performed after the new MTC device 100 connects to the network 200 in Embodiment 3 of the present invention. Processing at Steps S3101, S3102, S3105, S3106 and S3107 shown in FIG. 15 are the same as the processing at Steps S1101, S1102, S1105, S1106 and S1107 shown in FIG. 4, and so their descriptions are omitted. The processing at Steps S3103 and S3104 shown in FIG. 15 represent a feature of the processing in Embodiment 3 of the present invention.

At Step S3103 of FIG. 15, the new MTC device 100 receives, from the MME 220, a response message in response to a message requesting configuration information, and the configuration information acquisition unit 102 checks whether this response message includes an accessible time interval for the new MTC device 100 (next connection interval) or not (Step S3103). When the response message received from the MME 220 includes a next connection interval, the next connection interval is passed to the connection time decision unit 103 to instruct the connection time decision unit 103 to decide a next connection time.

In this case, the connection time decision unit 103 selects any time in the next connection interval acquired from the configuration information acquisition unit 102 and decides the selected time as a next connection time. Since this next connection time is later than the accessible time interval for the existing MTC device 110, the new MTC device 100 connects to the network 200 at this next connection time, whereby the new MTC device 100 can acquire configuration information of the existing MTC device 110 from the MME 220.

Figure 16:
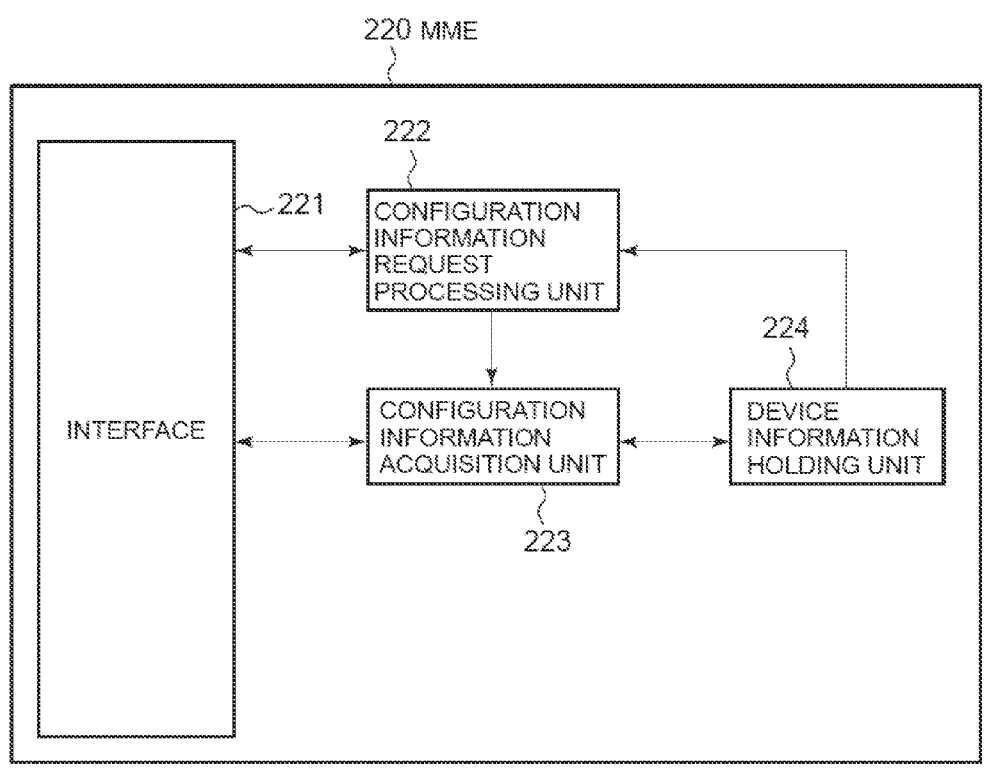
FIG. 16 is a block diagram showing an exemplary configuration of a MME in Embodiment 3 of the present invention.

FIG. 16 is a block diagram showing an exemplary configuration of the MME 220 in Embodiment 3 of the present invention. The MME 220 shown in FIG. 16 includes an interface 221, a configuration information request processing unit 222, a configuration information acquisition unit 223 and a device information holding unit 224.

The interface 221 includes a lower layer protocol module directly related to an interface of the MME 220. This lower layer protocol module is equipped with functions necessary to basic data communications such as mechanisms for signal modulation, encode compression, media access control and link layer control as well as functions of the entire physical layer and data link layer.

The configuration information request processing unit 222 has a function of, when receiving a request message from the new MTC device 100, instructing the configuration information acquisition unit 223 to acquire configuration information to be reported to the new MTC device 100 from the existing MTC device 110. When identification information of the existing MTC device 110 as an inquiry target is reported from the new MTC device 100, the configuration information request processing unit 222 notifies the configuration information acquisition unit 223 of the identification information.

The configuration information acquisition unit 223 has a function of referring to the device information holding unit 224 to select an existing MTC device 110 holding configuration information and acquiring the configuration information from the selected existing MTC device 110. Further the configuration information acquisition unit 223 has a function of checking whether the selected existing MTC device 110 connects to the network 200 or not. When the existing MTC device 110 connects to the network 200, the configuration information acquisition unit 223 makes an inquiry to the existing MTC device 110 to request to report the configuration information. On the other hand, when the existing MTC device 110 does not connect to the network 200, the configuration information acquisition unit 223 notifies the new MTC device 100 of an accessible time interval for the new MTC device 100 (next connection interval).

The device information holding unit 224 manages and holds, as information on existing MTC devices 110, connection or not to the network 200, information on a connection when they connect to the network, configuration information acquired from the existing MTC devices 110 and further an accessible time interval for existing MTC devices and an accessible time interval for the new MTC device, for example.

Since the configuration of the MTC server 300 in Embodiment 3 of the present invention is similar to the configuration (shown in FIG. 7) of the MTC server 300 in Embodiment 1 of the present invention, the description therefor is omitted. Herein as shown in FIG. 14, the new MTC device 100 makes an inquiry to the MTC server 300, thus recognizing the necessity to acquire configuration information from the existing MTC device 110. However, when the new MTC device 100 originally recognizes the necessity of acquiring configuration information from the existing MTC device 110 or the necessity of acquiring configuration information from the MME 220, the new MTC device 100 does not necessarily have to make an inquiry to the MTC server 300. That is, the new MTC device 100 may transmit a request for configuration information to the MME 220 irrespective of an instruction from the MTC server 300. In this case, although the MME 220 may specify an existing MTC device 110 as a target of the inquiry, when the new MTC device 100 holds information on the existing MTC devices 110 or can acquire information on the existing MTC devices 110 by making an inquiry to an information server (e.g., an ANDSF (Access Network Discovery & Selection Function) server) or the like, the new MTC device 100 may specify the existing MTC device 110 as an inquiry target and notify the MME 220 of the specified result (identification information on the existing MTC device 110). Further when the MME 220 (or the MTC server 300) recognizes the necessity of notifying the new MTC device 100 of information that the existing MTC device 110 holds or when there is information that the MME 220 (or the MTC server 300) itself requires, the MME 220 may notify the new MTC device 100 of a next connection interval without receiving a request message from the new MTC device 100. Especially when earlier acquisition of information from the existing MTC device 110 is required, the MME 220 (or the MTC server 300) allocates a time interval located forward (earlier time zone: for example, 2:10 AM to 2:15 AM) in the accessible time interval to the existing MTC device 110. Normally the existing MTC device 110 connects to the network at a time in the accessible time interval (2 AM to 3 AM), the existing MTC device 110 may access in the latter half of the time interval. In that case, timing of reporting information from the existing MTC device 110 will be delayed. To cope with this, a time interval located forward in the accessible time interval is allocated to the existing MTC device 110 holding necessary information, whereby information can be acquired earlier. Further, the accessible time interval for the existing MTC device 110 may be allocated to a plurality of existing MTC devices 110 belonging to a group so as not to delay the acquisition of information from the existing MTC device 110. For instance, when the length of the accessible time interval allocated beforehand is too long with reference to the number of MTC devices belonging to a group, information notification from a MTC device whose connection time to the network is set backward will be delayed. To cope with this, a time interval located forward in the accessible time interval is re-allocated thereto, whereby the connection time of each MTC device can be shifted to forward and information can be acquired earlier. That is, when the number of MTC devices is small, the MME 220 or the MTC server 300 narrows the length of a time interval allocated, and when the number is large, they widens the length, whereby appropriate connection times can be set for the MTC devices.

The function held by the MME 220 in Embodiment 3 of the present invention may be held by the MTC server 300 for execution. That is, the configuration of the MME 220 shown in FIG. 16 and the configuration of the MTC server 300 shown in FIG. 7 may be implemented by one network node. In this case, receiving a request for configuration information from the new MTC device 100, when it is confirmed that the required configuration information cannot be acquired from the existing MTC device 110 holding the configuration information or that the existing MTC device 110 does not connect to the network 200, the MTC server 300 returns a next connection interval of the new MTC device 100 to the new MTC device 100. Then when the existing MTC device 110 connects to the network 200, the MTC server 300 requests the configuration information to acquire the necessary configuration information and when the new MTC device 100 connects to the network 200, the MTC server 300 notifies the new MTC device 100 of the held configuration information. The MME 220 in Embodiment 3 of the present invention may operate under instructions of the MTC server 300. That is, the MTC server 300 instructs the MME 220 about the accessible time interval for the existing MTC devices 110 and the accessible time interval for the new MTC device 100, whereby allocation to each MTC device is performed. Further the function held by the MME 220 in Embodiment 3 of the present invention may be held by another entity (SGW: Serving Gateway, PGW: Packet Data Gateway) in a 3GPP network for execution. Except for the function of notifying the accessible time interval of the new MTC device 100 as a feature of Embodiment 3 of the present invention, various functions described in Embodiment 1 of the present invention are applicable to Embodiment 3 of the present invention as well.

As described above, according to Embodiment 3 of the present invention, the new MTC device 100 can acquire configuration information that the existing MTC device 110 holds. When the new MTC device 100 requests configuration information and even when the existing MTC device 110 is not in a connection state, a network node (e.g., the MME 220) acquires configuration information when the existing MTC device 110 connects next time, and the new MTC device 100 sets a next connection time on the basis of the accessible time interval of the new MTC device (next connection interval), whereby the new MTC device 100 can securely acquire the configuration information of the existing MTC device 110. The new MTC device 100 and the existing MTC devices 110 do not connect to the network 200 simply for acquisition of configuration information or for provision of configuration information, and they acquire or provide configuration information at the time of regular connection to the network 200, and therefore power consumption can be minimized.

Embodiment 4

Next, the following describes Embodiment 4 of the present invention.

Embodiment 1 to Embodiment 3 of the present invention describe the methods in which the new MTC device 100 requiring information connects to the network later than the connection of the existing MTC device 110 holding the information, whereby the new MTC device 100 can acquire the information. Embodiment 4 of the present invention describes the following method. That is, when an existing MTC device 110 holds information that is to be reported to another MTC device (new MTC device or another existing MTC device) or to the MTC server 330, the connection time of the existing MTC device 110 is set at an earlier time zone in an accessible time interval allocated already, whereby the existing MTC device 110 can connect to the network earlier than the connection of the correspondent requiring the information.

Figure 18:
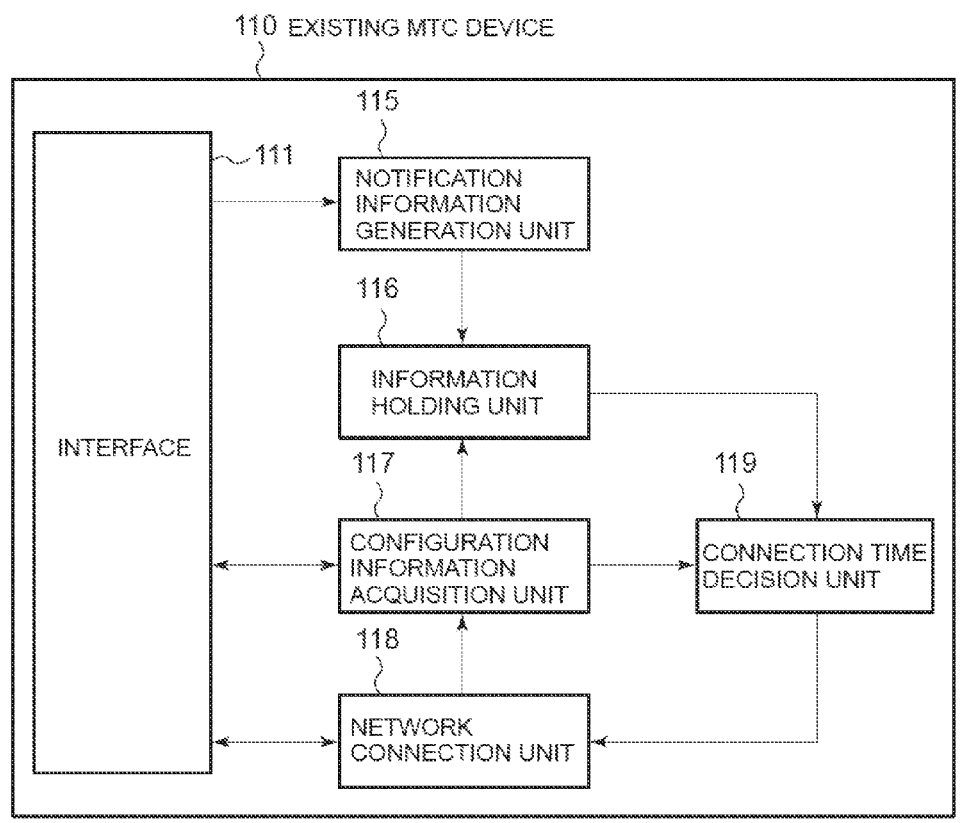
FIG. 18 is a block diagram showing an exemplary configuration of an existing MTC device in Embodiment 4 of the present invention.

FIG. 18 is a block diagram showing an exemplary configuration of the existing MTC device 110 in Embodiment 4 of the present invention. The existing MTC device 110 shown in FIG. 18 includes an interface 111, a notification information generation unit 115, an information holding unit 116, a configuration information acquisition unit 117, a network connection unit 118 and a connection time decision unit 119.

The interface 111 includes a lower layer protocol module directly related to an interface of the existing MTC device 110. This lower layer protocol module is equipped with functions necessary to basic data communications such as mechanisms for signal modulation, encode compression, media access control and link layer control as well as functions of the entire physical layer and data link layer.

The notification information generation unit 115 has a function of acquiring and generating information to be reported to the MTC server 300 or another MTC device. For instance, the notification information generation unit 115 generates information required by the MTC server such as information collected or an event detected by a sensor, and instructs the information holding unit 116 to hold the information.

The information holding unit 116 has a function of holding a next connection time decided by the connection time decision unit 119, an accessible time interval acquired by the configuration information acquisition unit 117 and a priority notification information list.

The network connection unit 118 has a function of executing processing to newly connect to the network 200 using the interface 101 and connection processing performed for a connection to the network 200 at the next connection time decided by the connection time decision unit 103.

The configuration information acquisition unit 117 has a function of, when connecting to the network 200, acquiring necessary configuration information from the MTC server 300 or the MME 220, and storing the information in the information holding unit 116. The acquired configuration information includes an accessible time interval allocated to the existing MTC devices 110 and priority information (priority notification information list) concerning information that the existing MTC device 110 transmits to the MTC server 300.

Figure 24:
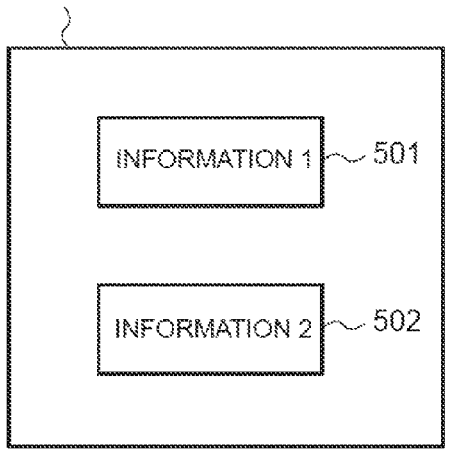
FIG. 24 shows an exemplary priority notification information list held by an existing MTC device in Embodiment 4 of the present invention.

As shown in FIG. 24, the priority notification information list 500 stored in the information holding unit 116 includes identifiers 501 and 502 representing types of information (priority notification information) that are required to be reported preferentially. Examples of the information included in the priority notification information list 500 include information (configuration information) to be reported to the new MTC device 100 or another existing MTC device 110 as described in Embodiments 1 to 3 of the present invention as well as information among information reported to the MTC server 300 enabling a prompt corresponding action by acquiring it earlier than other normal information The connection time decision unit 119 decides a time for a connection to the network within the range of the accessible time interval acquired by the configuration information acquisition unit 117. The connection time is set at any timing (calculated randomly) within the allocated accessible time interval. For the decision of the connection time, the connection time decision unit 119 refers to the information holding unit 116 and when the type of the information to be reported to the MTC server 300 is included in the priority notification information list 500, it is determined that such information has to be delivered to the MTC server 300 earlier than typical information.

Figure 19:
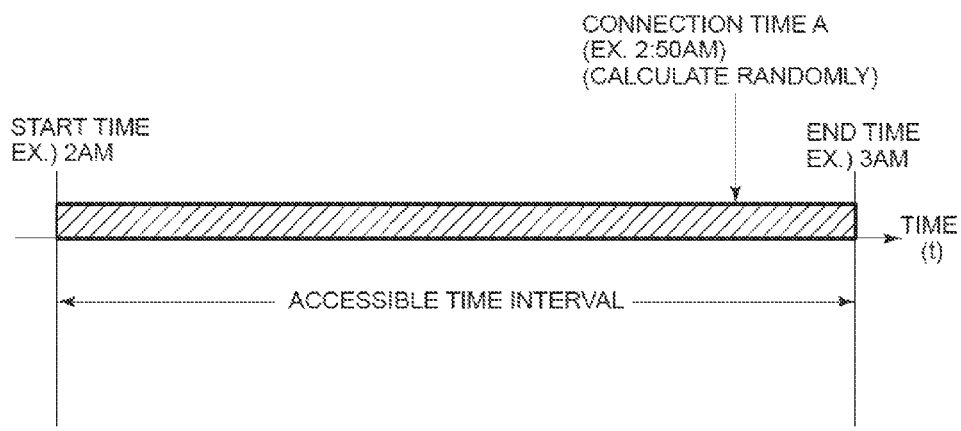
FIG. 19 schematically shows an exemplary access time interval of a MTC device in Embodiment 4 of the present invention.
Figure 20:
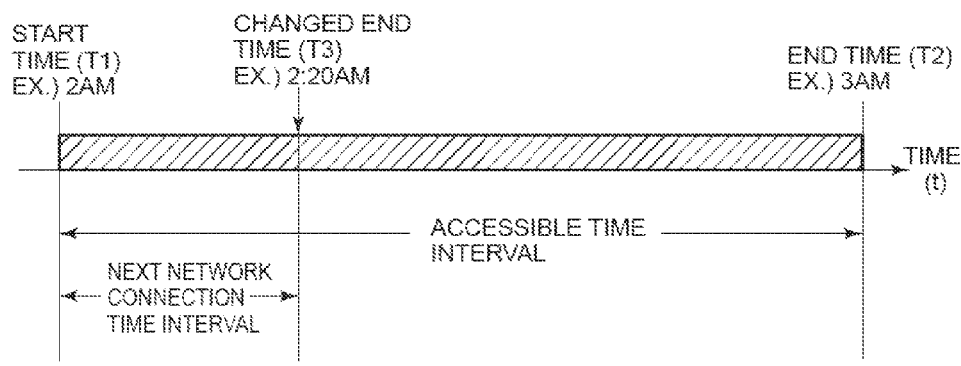
FIG. 20 schematically shows an exemplary access time interval of a MTC device in Embodiment 4 of the present invention.
Figure 21:
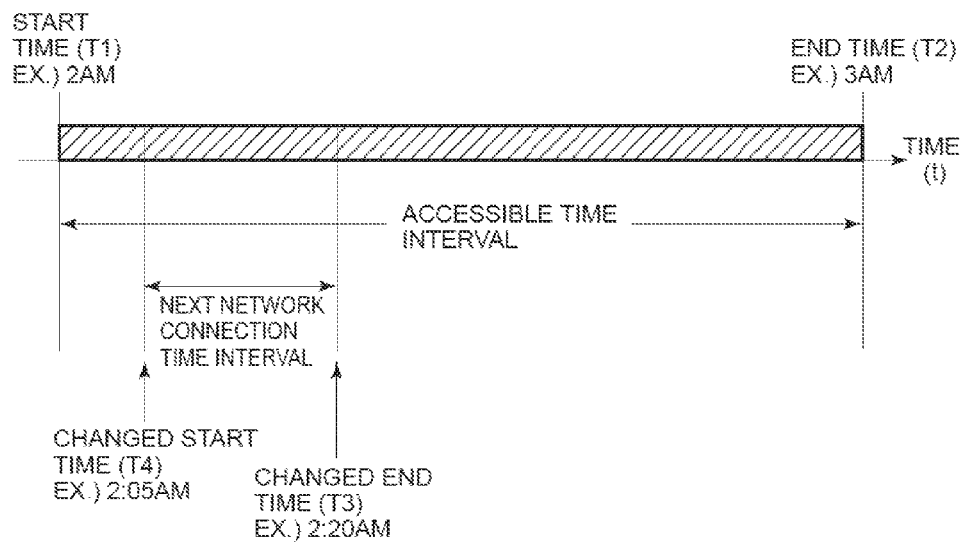
FIG. 21 schematically shows an exemplary access time interval of a MTC device in Embodiment 4 of the present invention.

However, as shown in FIG. 19, when the connection time is found randomly using the accessible time interval allocated to a group of MTC devices to which the existing MTC device 110 belongs, a backward time as connection time A may be set therefor, for example. In this case, data notification to the MTC server 300 will be delayed. Further in order to deliver the information to the MTC server 300 earlier than typical information, instead of using a time found by the aforementioned random calculation, when the information transmission is started almost at the same time as the starting time of the accessible time interval, transmission timing may be overlapped with other MTC devices reporting the same types of information, which may lead to the possibility of congestion in the network 200. That is, even in the case of data that has to be delivered to the MTC server 300 earlier than typical information, it has to be delivered so as to avoid overlapping of transmission timing. To this end, when the type of information to be reported to the MTC server 300 is included in the priority notification information list 500, the connection time decision unit 119 shortens the allocated accessible time interval and sets any timing in the range of the shortened accessible time interval as a connection time. That is, for a notification of priority notification information, the connection time decision unit 119 sets a value located forward in the range of the accessible time interval as a next connection time. In this way, using the shortened time interval, the new MTC device 100 can find a time suitable for the information to be reported instantly. The accessible time interval can be changed as follows. That is, as shown in FIG. 20, the ending time is changed from (T2) to (T3), whereby the changed accessible time interval will be duration from the starting time (T1) to the ending time (T3), so that a next network connection time interval is set during 20 minutes from 2 AM to 2:20 AM. Thereby, a connection time to the network 200 can be set at an earlier time zone and it is calculated randomly, and therefore data can be transmitted to the MTC server 300 earlier and overlapped starting of data transmission with another MTC device can be prevented. Alternatively, as shown in FIG. 21, as well as the change of the ending time, the starting time (T1) may be changed to (T4) so that a next network connection time interval is set during 15 minutes from 2:05 AM to 2:20 AM.

Figure 25:
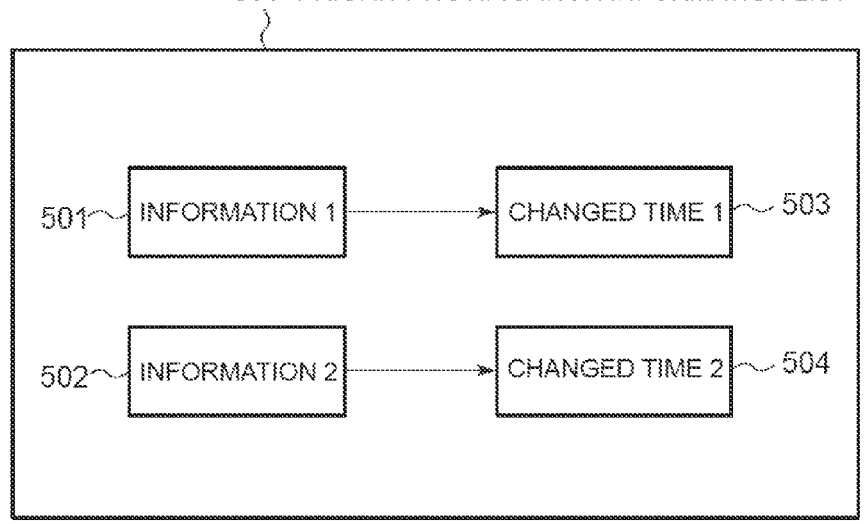
FIG. 25 shows an exemplary priority notification information list held by an existing MTC device in Embodiment 4 of the present invention.

As for the degree of a change in ending time (shift to forward), a change time common to all priority notification information may be used, or the change time may be determined based on information to be reported. In the latter case, as shown in FIG. 25, the priority notification information list may include a change time 503, 504 each corresponding to the priority information. The same goes for a change in starting time. The change time may be determined on the basis of the size of data to be transmitted. In this case, since data of larger size requires longer time to complete the transmission, the ending time is changed forward.

Figure 22:
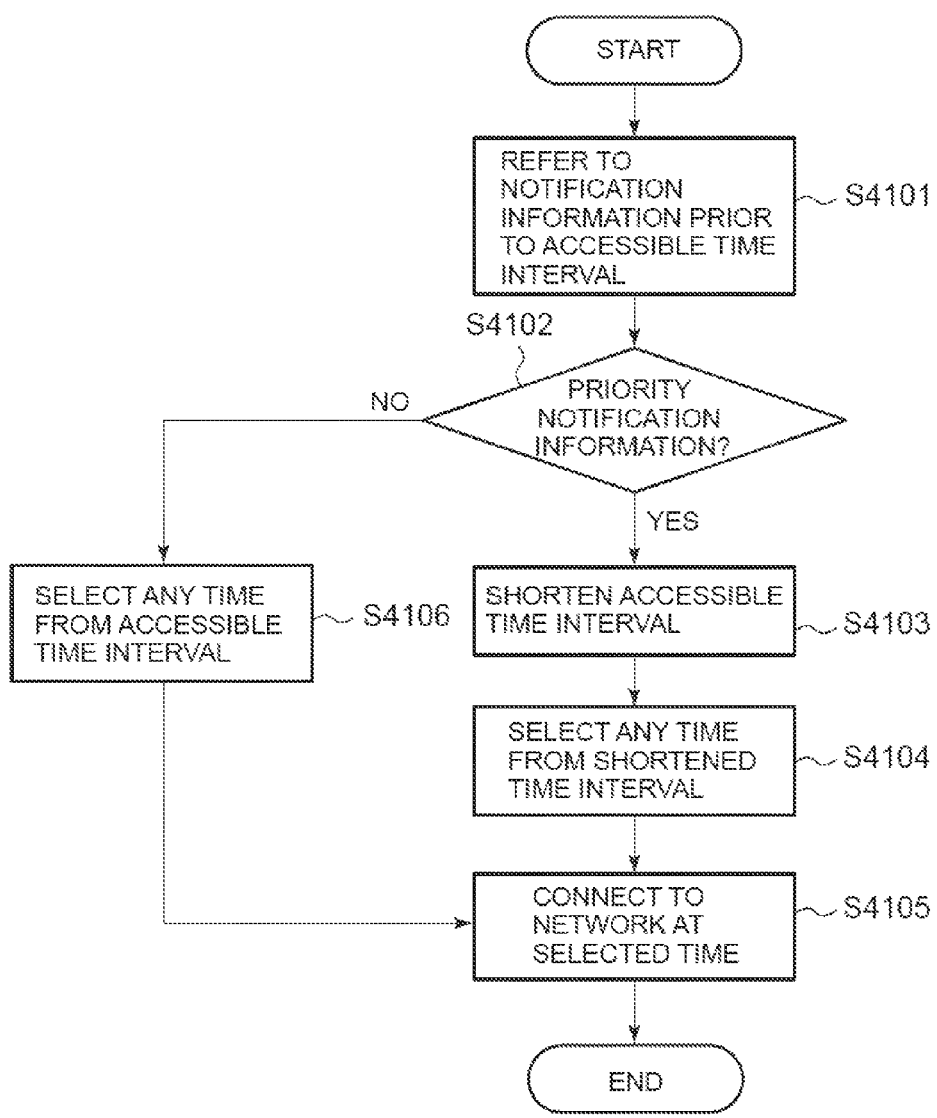
FIG. 22 is a flowchart showing exemplary processing performed by an existing MTC device prior to a connection to the network in Embodiment 4 of the present invention.

FIG. 22 is a flowchart showing exemplary processing performed by the connection time decision unit 119 of the existing MTC device 110. In FIG. 22, the connection time decision unit 119 refers to information to be reported prior to a starting time of the accessible time interval allocated beforehand (Step S4101), and checks whether the information is included in the priority notification information list 500 (priority notification information) or not (Step S4102). When the information is included in the list, the connection time decision unit 119 shortens the allocated accessible time interval (Step S4103) and sets any timing in the range of the shortened accessible time interval as a connection time (S4104). Then connection is performed to the network 200 at the set time to report the information (Step S4105). On the other hand, when the information is not included in the priority notification information list 500 at Step S4102, the allocated accessible time interval is used as it is, and any time in the range is set as a connection time. Then connection is performed to the network 200 at the set time to report the information (Step S4105). Herein as another method to find a time suitable for information to be reported, a random value may be calculated repeatedly until a connection time suitable for the information to be reported (connection time located forward) can be found.

Figure 23:
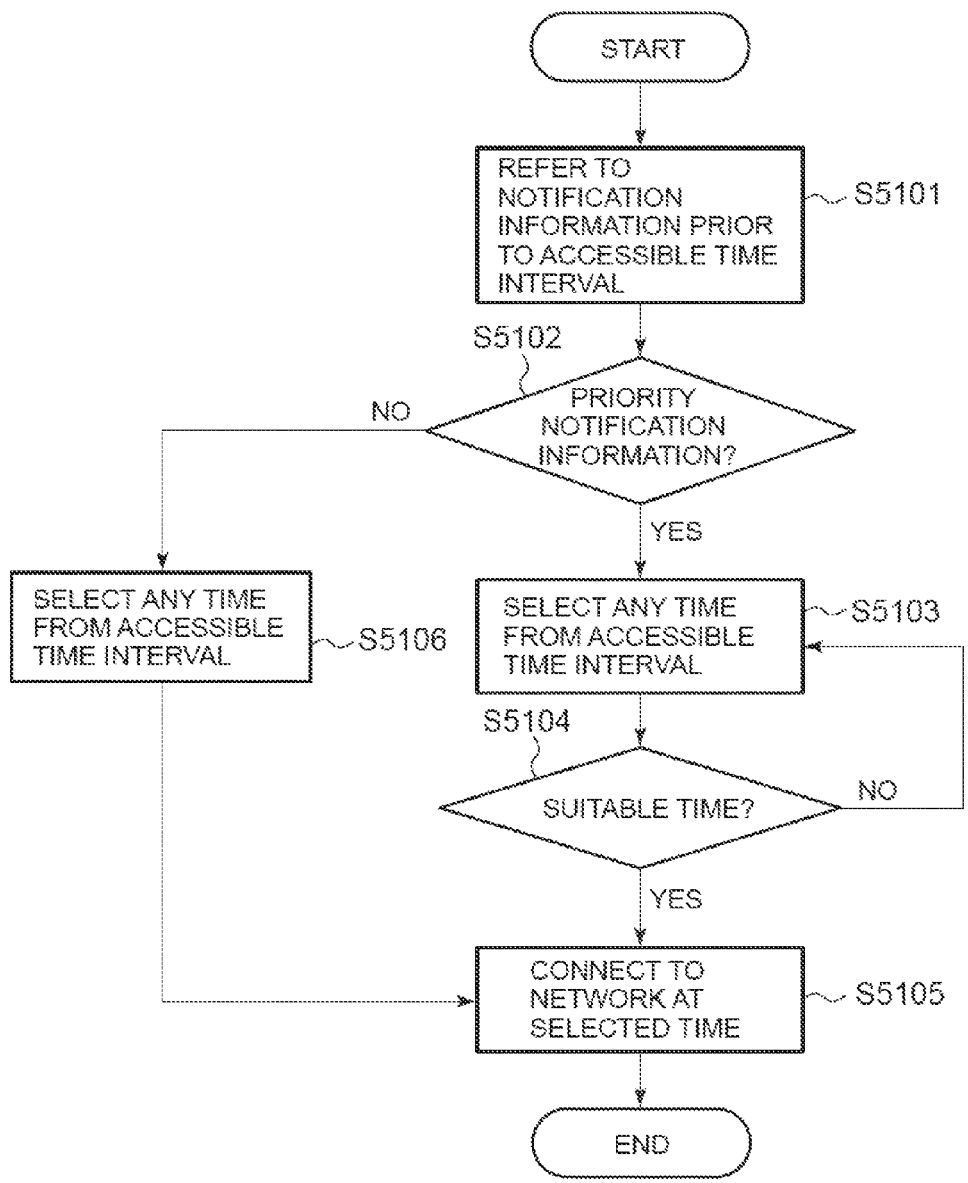
FIG. 23 is a flowchart showing exemplary processing performed by an existing MTC device prior to a connection to the network in Embodiment 4 of the present invention.

FIG. 23 is a flowchart showing another exemplary processing performed by the connection time decision unit 119 of the existing MTC device 110. In FIG. 23, the connection time decision unit 119 refers to information to be reported prior to a starting time of the accessible time interval allocated beforehand (Step S5101), and checks whether the information is included in the priority notification information list 500 (priority notification information) or not (Step S5102). When the information is included in the list, the connection time decision unit 119 selects randomly any time in the range of the allocated accessible time interval (Step S5103). The connection time decision unit 119 checks whether the selected time is a suitable time for the information to be reported or not (Step S5104). When the selected time is a suitable time, connection is performed to the network 200 at the selected time to report the information (Step S5105). When it is not a suitable time, the procedure returns to Step S5103 where any timing in the range of the accessible time interval is randomly selected again. On the other hand, when the information is not included in the priority notification information list at Step S5102, any time in the allocated accessible time interval is selected (S5106) and connection is performed to the network at the selected time to report the information (Step S5105). As another method to find a time suitable for information to be reported, a time may be calculated randomly a fixed number of times in the range of the accessible time interval, and the earliest time among them may be selected as a next connection time. Except for the function of deciding a connection time of the MTC device 100 to which information is to be reported as a feature of Embodiment 4 of the present invention, various functions described in Embodiment 1 of the present invention are applicable to Embodiment 4 of the present invention as well.

As described above, according to Embodiment 4 of the present invention, when the existing MTC device 110 has information to be reported preferentially to the new MTC device 100, another existing MTC device 110 or the MTC server 300, such information can be reported at an earlier time zone in the allocated accessible time interval. Thereby, the correspondent requiring the information can acquire the information earlier than usual, and so a necessary action can be executed earlier. Especially for the MTC server 300 using information to provide a user with a service, it is effective to acquire important information earlier than usual. Further since discrimination of the information to be reported and calculation of a connection time are all performed by MTC devices, load on the MTC server 300 or the MME 220 can be reduced. Moreover when the acquired information is effective information for another MTC device, the MTC server 300 can notify the other device connecting to the network at a connection time calculated by a typical method (time later than the existing MTC device 110) of the information acquired from the existing MTC device 110.

As stated above, according to Embodiments 1 to 4 of the present invention, the existing MTC device 110 does not have to connect to the network simply for letting the new MTC device 100 acquire necessary configuration information, but the new MTC device 100 can acquire the necessary configuration information using a chance when the existing MTC device 110 regularly connects to the network 200. Therefore power consumption by the existing MTC device 110 can be minimized. Further the new MTC device 100 can securely acquire configuration information of the existing MTC device 110 when connecting to the 200 next time, and therefore there is no need to connect to the network 200 repeatedly. Further since the new MTC device 100 can acquire configuration information that the existing MTC device 110 holds, even the MTC device newly connected to the network 200 can start an operation at the level equal to that of the existing MTC device 110 operating on the basis of sufficient information, and therefore information required by the MTC server 300 can be provided quickly.

Embodiments 1 to 4 of the present invention describe the case where the present invention is applied to MTC techniques. However, the application range of the present invention is not limited to MTC techniques, but is applicable to typical UE (User Equipment). The present invention is further applicable to any other communication techniques. Embodiments 1 to 3 of the present invention exemplify the configuration information as one example of information that the new MTC device 100 acquires from another MTC device. However, information that the new MTC device 100 acquires from another MTC device is not limited to configuration information. For instance, the new MTC device 100 can desire various types of information such as sensing data collected by another MTC device, IDs and IP addresses allocated in a group.

Each functional block used in the description of the above-stated embodiments may be typically implemented as a LSI (Large Scale Integration) that is an integrated circuit. These blocks may be individually configured as one chip, or one chip may include a part or all of the functional blocks. LSIs may be called an IC (Integrated Circuit), a system LSI, a super LSI, and an ultra LSI depending on the degree of integration.

A technique for integrated circuit is not limited to a LSI, but an integrated circuit may be achieved using a dedicated circuit or a general-purpose processor. A FPGA (Field Programmable Gate Array) capable of programming after manufacturing a LSI and a reconfigurable processor capable of reconfiguring connection and setting of a circuit cell inside a LSI may be used.

Further, if a technique for integrated circuit that replaces LSIs becomes available with the development of a semiconductor technique or derived techniques, functional blocks may be naturally integrated using such a technique. For instance, biotechnology may be applied thereto.

INDUSTRIAL APPLICABILITY

The present invention has the advantageous effect of letting a communication node acquire predetermined newer information (e.g., configuration information) held by another communication node while minimizing power consumption by communication nodes. The present invention is applicable to communication techniques for autonomous exchange of information between communication nodes and especially for MTC techniques.

The invention claimed is:

1. A network node in a communication system including an existing communication node already connected to a network under management of the network node and including a new communication node newly connecting to the network to acquire predetermined information of the existing communication node, comprising:
a connection checking unit configured to check whether the existing communication node connects or not to the network when receiving a request for the predetermined information from the new communication node;
a first predetermined information acquisition unit configured to request the predetermined information from the existing communication node and acquire the predetermined information from the existing communication node when the connection checking unit confirms that the existing communication node connects to the network;

a first predetermined information notification unit configured to notify the new communication node of the predetermined information acquired by the first predetermined information acquisition unit;

a time information notification unit configured to notify the new communication node of time information to allow the new communication node to decide a next connection time, when the connection checking unit confirms that the existing communication node does not connect to the network;

a second predetermined information acquisition unit configured to request the predetermined information from the existing communication node and acquire the predetermined information from the existing communication node, when a connection of the existing communication node to the network is confirmed after notification of the time information to the new communication node by the time information notification unit;

a predetermined information holding unit configured to hold the predetermined information acquired by the second predetermined information acquisition unit; and a second predetermined information notification unit configured to notify the new communication node of the predetermined information held by the predetermined information holding unit, when a connection of the new communication node to the network based on the time information is confirmed.

2. The network node according to claim 1, wherein the time information includes a next connection time of the existing communication node to the network.

3. The network node according to claim 1, wherein the time information includes a next connection time of the new communication node to the network.

4. The network node according to claim 3, further comprising a connection time decision unit configured to decide a next connection time of the new communication node to the network so that the next connection time of the new communication node to the network is a time later than a next connection time of the existing communication node to the network.

5. The network node according to claim 1, wherein the time information includes a next connection time zone of the new communication node to the network.

6. The network node according to claim 5, further comprising a connection time zone decision unit configured to decide a next connection time zone of the new communication node to the network so that the next connection time zone of the new communication node to the network is a time zone later than a next connection time zone of the existing communication node to the network.

7. The network node according to claim 1, wherein when identification information of the existing communication node is notified from the new communication node with the request for the predetermined information, the connection checking unit is configured to check whether the existing communication node specified by the identification information connects or not to the network.

8. The network node according to claim 1, wherein the connection checking unit is configured to specify the existing communication node located geographically close to the new communication node, and check whether the specified existing communication node connects or not to the network.

9. A communication node operating as a new communication node in a communication system including an existing communication node already connected to a network under management of a network node and including the new communication node newly connecting to the network to acquire predetermined information of the existing communication node, comprising:

a first predetermined information request unit configured to transmit a request for the predetermined information to the network node;

a first predetermined information acquisition unit configured to receive the predetermined information from the network node as a response to the request for the predetermined information by the first predetermined information request unit;

a time information reception unit configured to receive time information to decide a next connection time of the new communication node as a response to the request for the predetermined information by the first predetermined information request unit;

a connection time decision unit configured to decide a next connection time of the new communication node to the network on a basis of the time information;

a second predetermined information request unit configured to connect to the network at the connection time decided by the connection time decision unit to transmit a request for the predetermined information to the network node; and a second predetermined information acquisition unit configured to receive the predetermined information from the network node as a response to the request for the predetermined information by the second predetermined information request unit.

10. The communication node according to claim 9, wherein the time information includes a next connection time of the existing communication node to the network.

11. The communication node according to claim 10, wherein the connection time decision unit is configured to decide a next connection time of the new communication node to the network so that the next connection time of the new communication node to the network is at a time later than a next connection time of the existing communication node to the network.

12. The communication node according to claim 9, wherein the time information includes a next connection time of the new communication node to the network.

13. The communication node according to claim 9, wherein the time information includes a next connection time zone of the new communication node to the network.

14. The communication node according to claim 13, wherein the connection time decision unit is configured to decide any time in the next connection time zone of the new communication node to the network as a next connection time zone of the new communication node to the network.

15. The communication node according to claim 9, wherein the first predetermined information request unit is configured to make a notification of identification information of the existing communication node as well as the request for the predetermined information.

16. A communication node operating as an existing communication node in a communication system including the existing communication node already connected to a network under management of a network node and including a new communication node newly connecting to the network to acquire predetermined information of the existing communication node, comprising:

a predetermined information request reception unit configured to receive a request for the predetermined information from the network node during a connection to the network; and a predetermined information notification unit configured to notify the network node of the predetermined information as a response to the request for the predetermined information.

17. The communication node according to claim 16, further comprising a next connection time notification unit configured to notify the network node of a next connection time to the network, prior to disconnection of a connection to the network.

18. The communication node according to claim 16, further comprising a connection time decision unit configured to shorten an ending time of a typically allocated accessible time interval to the network to shorten the accessible time interval and set a time included in the shortened accessible time interval as a next connection time to the network, when there is information to be reported preferentially.

* * * * *